(12) United States Patent
DeVincentis et al.

(10) Patent No.: US 8,232,730 B2
(45) Date of Patent: Jul. 31, 2012

(54) ELECTRODELESS PLASMA LAMP SYSTEMS AND METHODS

(75) Inventors: Marc DeVincentis, Palo Alto, CA (US); Paul Ralston, Palo Alto, CA (US); Gregg Hollingsworth, Tempe, AZ (US); Jae Won Kim, Irvine, CA (US)

(73) Assignee: Luxim Corporation, Sunnyvale, CA (US)

( * ) Notice: Subject to any disclaimer, the term of this patent is extended or adjusted under 35 U.S.C. 154(b) by 255 days.

(21) Appl. No.: 12/849,243

(22) Filed: Aug. 3, 2010

(65) Prior Publication Data

US 2010/0295453 A1    Nov. 25, 2010

Related U.S. Application Data

(63) Continuation of application No. 12/445,671, filed as application No. PCT/US2007/081550 on Oct. 16, 2007.

(60) Provisional application No. 60/852,289, filed on Oct. 16, 2006, provisional application No. 60/852,326, filed on Oct. 16, 2006, provisional application No. 60/852,328, filed on Oct. 16, 2006.

(51) Int. Cl.
 *H05B 31/26* (2006.01)
(52) U.S. Cl. .......... 315/111.21; 315/39; 315/111.01; 315/248; 315/344
(58) Field of Classification Search .......... None
See application file for complete search history.

(56) References Cited

U.S. PATENT DOCUMENTS

| | | | |
|---|---|---|---|
| 3,787,705 | A | 1/1974 | Bolin et al. |
| 3,826,950 | A | 7/1974 | Hruda et al. |
| 4,001,631 | A | 1/1977 | McNeill et al. |
| 4,206,387 | A | 6/1980 | Kramer et al. |
| 4,485,332 | A | 11/1984 | Ury et al. |
| 4,498,029 | A | 2/1985 | Yoshizawa et al. |
| 4,633,140 | A | 12/1986 | Lynch et al. |
| 4,749,915 | A | 6/1988 | Lynch et al. |
| 4,795,658 | A | 1/1989 | Kano et al. |
| 4,887,192 | A | 12/1989 | Simpson et al. |

(Continued)

FOREIGN PATENT DOCUMENTS

JP    8148127    6/1996

(Continued)

OTHER PUBLICATIONS

"U.S. Appl. No. 12/445,671, Preliminary Amendment mailed Apr. 15, 2009", 4 pgs.

(Continued)

*Primary Examiner* — Anh Tran
(74) *Attorney, Agent, or Firm* — Schwegman, Lundberg & Woessner, P.A.

(57) ABSTRACT

An electrodeless plasma lamp having a bulb containing a fill that forms a light-emitting plasma is described. The lamp includes a power amplifier to provide radio frequency power to the fill at a frequency in the range of about 50 MHz to 10 GHz and the power amplifier is configured to operate in at least two classes of operation. Control electronics of the lamp is configured to change the class of operation of the power amplifier during operation of the plasma lamp. For example, the power amplifier may be configured to operate as a class A/B amplifier during at least a first mode of operation and a class C amplifier during at least a second mode of operation.

20 Claims, 10 Drawing Sheets

U.S. PATENT DOCUMENTS

| | | | |
|---|---|---|---|
| 4,950,059 A | 8/1990 | Roberts | |
| 4,975,625 A | 12/1990 | Lynch et al. | |
| 4,978,891 A | 12/1990 | Ury | |
| 5,039,903 A | 8/1991 | Farrall | |
| 5,070,277 A | 12/1991 | Lapatovich | |
| 5,072,157 A | 12/1991 | Greb et al. | |
| 5,084,801 A | 1/1992 | El-Hamamsy et al. | |
| 5,086,258 A | 2/1992 | Mucklejohn et al. | |
| 5,118,997 A | 6/1992 | El-Hamamsy | |
| 5,361,274 A | 11/1994 | Simpson et al. | |
| 5,438,242 A | 8/1995 | Simpson | |
| 5,448,135 A | 9/1995 | Simpson | |
| 5,498,937 A | 3/1996 | Korber et al. | |
| 5,525,865 A | 6/1996 | Simpson | |
| 5,594,303 A | 1/1997 | Simpson et al. | |
| 5,786,667 A | 7/1998 | Simpson et al. | |
| 5,910,710 A | 6/1999 | Simpson | |
| 5,910,754 A | 6/1999 | Simpson et al. | |
| 5,923,116 A | 7/1999 | Mercer et al. | |
| 6,020,800 A | 2/2000 | Arakawa et al. | |
| 6,031,333 A | 2/2000 | Simpson | |
| 6,049,170 A | 4/2000 | Hochi et al. | |
| 6,137,237 A | 10/2000 | MacLennan et al. | |
| 6,246,160 B1 | 6/2001 | MacLennan et al. | |
| 6,265,813 B1 | 7/2001 | Knox et al. | |
| 6,313,587 B1 | 11/2001 | MacLennan et al. | |
| 6,424,099 B1 | 7/2002 | Kirkpatrick et al. | |
| 6,566,817 B2 | 5/2003 | Lapatovich | |
| 6,666,739 B2 | 12/2003 | Pothoven et al. | |
| 6,737,809 B2 | 5/2004 | Espiau et al. | |
| 6,856,092 B2 | 2/2005 | Pothoven et al. | |
| 6,922,021 B2 * | 7/2005 | Espiau et al. | 315/248 |
| 7,034,464 B1 | 4/2006 | Izadian et al. | |
| 7,291,985 B2 | 11/2007 | Espiau et al. | |
| 7,348,732 B2 | 3/2008 | Espiau et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,429,818 B2 | 9/2008 | Chang et al. | |
| 2001/0035720 A1 | 11/2001 | Guthrie et al. | |
| 2005/0099130 A1 * | 5/2005 | Espiau et al. | 315/39 |
| 2005/0286263 A1 | 12/2005 | Champion et al. | |
| 2006/0208648 A1 | 9/2006 | Espiau et al. | |
| 2006/0250090 A9 | 11/2006 | Guthrie et al. | |
| 2007/0109069 A1 | 5/2007 | Espiau et al. | |
| 2008/0211971 A1 | 9/2008 | Pradhan | |
| 2010/0253231 A1 | 10/2010 | Devincentis et al. | |

FOREIGN PATENT DOCUMENTS

| | | |
|---|---|---|
| KR | 1020050018587 A | 2/2005 |
| WO | WO-2006070190 A1 | 7/2006 |
| WO | WO-2006129102 A2 | 12/2006 |
| WO | WO-2007138276 A2 | 12/2007 |
| WO | WO-2008048978 A2 | 4/2008 |
| WO | WO-2008048978 A3 | 4/2008 |

OTHER PUBLICATIONS

"Chapter 4—Cavity Resonators, Army Technical Manual, TM 11-673—Generation and Transmission of Microwave Energy", (Jun. 1953), 12 pgs.

"Chapter 6.3—Rectangular Waveguide Cavities", in: Microwave Engineering, Pozar, D. M., Editor (John Wiley & Sons, Inc.), (Jul. 1997), pp. 313-318.

"International Application Serial No. PCT/US2007/081550, International Preliminary Examination Report mailed Apr. 30, 2009", 22 pgs.

"International Application Serial No. PCT/US2007/081550, Search Report mailed Mar. 20, 2008", 3 pgs.

"International Application Serial No. PCT/US2007/081550, Written Opinion, mailed Mar. 20, 2008", 19 pgs.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, and Don Wilson, 16 pgs.

Guthrie, Charles, "Lamp", U.S. Appl. No. 60/687,458, filed Jun. 6, 2005, 12 pgs.

Guthrie, Charles, et al., "Lamp", U.S. Appl. No. 60/687,280, filed Jun. 3, 2005, and Neate, 17 pgs.

Inventors Not Listed, "Lamp", International Application Serial No. PCT_GB2007_001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That Is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

Wilson, D,, et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That Is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics)", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

* cited by examiner

ELECTRODELESS PLASMA LAMP SYSTEMS AND METHODS

CROSS REFERENCE TO RELATED APPLICATIONS

This application is a continuation of U.S. patent application Ser. No. 12/445,671, filed on Jun. 11, 2010, which is a U.S. National Stage Filing under 35 U.S.C. 371 from International Application No. PCT/US2007/081550, filed Oct. 16, 2007 and published in English as WO 2008/048978 A2 on Apr. 24, 2008, and republished as WO 2008/048978 A3 on Jul. 17, 2008, which claims benefit of priority to U.S. Provisional Application No. 60/852,289, entitled "SYSTEMS AND METHODS FOR COUPLING POWER TO AN ELECTRODELESS PLASMA LAMP," filed Oct. 16, 2006; U.S. Provisional Application No. 60/852,326, entitled "PLASMA LAMP SYSTEMS AND METHODS USING MULTI-MODE AMPLIFIER," filed Oct. 16, 2006; and U.S. Provisional Application No. 60/852,328, entitled "SYSTEMS AND METHODS FOR STARTUP AND CONTROL OF ELECTRODELESS PLASMA LAMP," filed Oct. 16, 2006, which applications are incorporated herein by reference in their entirety.

BACKGROUND

I. Field

The field relates to systems and methods for generating light, and more particularly to electrodeless plasma lamps.

II. Background

Electrodeless plasma lamps may be used to provide bright, white light sources. Because electrodes are not used, they may have longer useful lifetimes than other lamps. In an electrodeless plasma lamp, radio frequency power may be coupled into a fill in a bulb to create a light emitting plasma. However, as the fill is ignited and the plasma heats up, the load conditions of the lamp may change. This can impact the startup procedure as well as the electronics used to drive the lamp. In addition, different modes of operation may require different operating conditions.

SUMMARY

Example embodiments provide systems and methods for an electrodeless plasma lamp. In some example embodiments, RF power is provided to the lamp body and fill in the bulb at a frequency in the range of between about 50 MHz and about 30 GHz, or any range subsumed therein. In some examples, the frequency is less than 1 GHz. In an example embodiment, the RF power causes a light emitting plasma discharge in the bulb. In example embodiments, RF power is coupled by radiating RF power into a lamp body and establishing a standing wave. In some embodiments, RF power may be provided at or near a resonant frequency for the load formed by the lamp body, bulb and fill.

In one example embodiment, an RF feed is coupled to the lamp body to provide power for ignition and steady state operation of the lamp. Feedback is used to adjust frequency in response to changing conditions of the lamp during startup. A phase shifter is used to adjust the phase of the power between ignition and steady state operation. A sensor may detect a lamp operating condition that automatically triggers a shift in phase after the fill in the bulb is vaporized.

In some example embodiments, the phase shift may continue to be adjusted as the plasma heats up and the impedance continues to change. In one example, a lookup table is used to store parameters indicating the voltage to be applied to a phase shifter as the frequency ramps down as the plasma heats up. In another example, control electronics interpolate a plurality of values to be used for shifting the phase during this ramp.

In some example embodiments, phase is automatically adjusted on a periodic basis. These phase adjustments may be applied during startup when the fill is vaporized, during heat up of the plasma after the fill is vaporized and/or during the run mode of the lamp after the plasma is reaches its full operating temperature. In one example, control electronics may automatically adjust the phase to determine the effect on a lamp operating condition, such as the output intensity of the light or power coupling to the lamp body.

In some example embodiments, the brightness is stabilized after the plasma achieves high brightness. In some example embodiments, the phase is adjusted to maintain a substantially constant brightness as the plasma heats up after the lamp initially transitions to high brightness. In some embodiments, the brightness is stabilized within 5-20 seconds or less after ignition, even though the load conditions may change as the plasma continues to heat up for several minutes. In some embodiments, a lookup table is used to store parameters to control the brightness during heat up. In other embodiments, a control parameter is automatically adjusted in response to detection of a lamp operating condition, such as lamp output intensity detected by a photosensor. In some example embodiments, brightness is quickly stabilized even though the fill may include a metal halide or other material that heats up over a longer period of time and continues to cause changes to the impedance of the load.

In some example embodiments, impedance matching circuit elements may be switched into or out of a lamp drive circuit to adjust to changing load conditions. In one example, a capacitive element may be switched out of the circuit after lamp startup. In another aspect, a variable impedance matching circuit element may be adjusted based on changing load conditions. In one example, a variable capacitor may be adjusted between startup and run mode. In some embodiments, these aspects may be used to provide better impedance matching and improved power coupling during startup and run mode even though the load conditions change.

In some example embodiments, an amplifier may be operated using different gate bias voltages during different operating modes of the lamp. The bias condition of the amplifier has a large impact on DC-RF efficiency.

In some example embodiments, the operating class of an amplifier may be selected for different operating modes of a lamp based on a desired trade-off between efficiency and dynamic range. For example, an amplifier biased to operate in Class C mode is more efficient than an amplifier biased to operate in Class B mode, which in turn is more efficient than an amplifier biased to operate in Class A/B mode. However, an amplifier biased to operate in Class A/B mode has a better dynamic range than an amplifier biased to operate in Class B mode, which in turn has better dynamic range than an amplifier biased to operate in Class C mode.

In some example embodiments, when the lamp is first turned on, the amplifier is biased in a Class A/B mode. Class A/B provides better dynamic range and more gain to allow the amplifier to ignite the plasma and to adjust to the changing load conditions during startup. Once the plasma reaches its steady state operating condition, the amplifier may be biased in Class C mode. This provides improved efficiency.

In some example embodiments, the operating class of the amplifier is changed after startup in response to changes in a lamp operating condition. In one example, the operating class of the amplifier is changed from Class C mode to Class A/B mode or Class B mode if the brightness of the lamp is modulated below a certain threshold level. In one example the threshold is between 50-80% of full brightness or any range subsumed therein.

In some example embodiments, control electronics provide a gate bias voltage to an amplifier to control the operating class of the amplifier. The control electronics is responsive to lamp operating conditions to change the operating class of the amplifier. In one example, the control electronics is responsive to an optical sensor or RF power sensor indicating that the plasma has reached high brightness. In another example, the control electronics is responsive to a brightness control signal. In example embodiments, the gate bias voltage may be adjusted during operation of the lamp to change the class of the amplifier. In other embodiments, the gate bias voltage may be adjusted during operation of the lamp to enhance efficiency even if the class of the amplifier is not changed. For example, the gate bias applied to a class D, E or F may be adjusted to enhance efficiency without changing the class of the amplifier.

In some example embodiments, the lamp body includes a solid dielectric body with an electrically conductive coating. In example embodiments, power is coupled from the lamp body to the bulb through an uncoated dielectric surface adjacent to the bulb. In example embodiments, the surface area through which power is coupled to the bulb is relatively small. In some embodiments, the surface area is in the range of about 5%-50% of the outer surface area of the bulb or any range subsumed therein. In some embodiments, the surface area is less than 100 $mm^2$. In other examples, the surface area is less than 75 $mm^2$, 50 $mm^2$ or 35 $mm^2$. In some embodiments, the surface area is disposed symmetrically around a middle region of the bulb and is spaced apart from the ends of the bulb. In some embodiments, this allows power to be concentrated in a narrow region in the middle of the bulb and a small arc length is formed that does not impinge on the ends of the bulb.

In some example embodiments, the interior of the bulb has a volume in the range of about 10 $mm^3$ to 750 $mm^3$ or any range subsumed therein. In some examples, the bulb has an interior volume of less than about 100 $mm^3$ or less than about 50 $mm^3$ In some example embodiments, the lamp body has a thin region adjacent to a bulb. In example embodiments, power is concentrated in the thin region of the lamp body. In some embodiments the thin region has a thickness of less than 5 mm. In some embodiments, the thin region has a thickness less than the length of the bulb. In some embodiment, the thin region is bounded by an electrically conductive material on opposing sides. In some embodiments, the thin region with electrically conductive coatings provides a high capacitance that concentrates power near the bulb. In some embodiments, this is the region of the lamp body with the highest capacitance.

In some example embodiments, the thin region forms a shelf between the bulb and a substantially thicker region of the lamp body. In some examples, the length of the shelf between the thicker region of the lamp body and the bulb is less than about 1-5 mm or any range subsumed therein. In some embodiments, the distance is in the range of about 1-2 mm.

In some example embodiments, a gap is formed between the shelf and the bulb. In some embodiments, the gap is filled with a dielectric material having a lower thermal conductivity than the lamp body. In some embodiments, the gap is less than about 1 mm. In some embodiments, the gap is in the range of about 1/8 to 1 mm or any range subsumed therein. In some embodiments, the gap is less than about 0.5 mm.

In some example embodiments, a drive probe is inserted into the lamp body a distance that is more than 80% of the distance through the lamp body. In some embodiments, the probe extends more than 90% or 95% of the distance through the lamp body. In some embodiments, the end of the probe is a distance from a surface of the lamp body in the range of about 1-5 mm or any range subsumed therein. In some embodiments, the diameter of the probe is increased to improve coupling so the probe can be kept further from the surface of the lamp body. In some embodiments, the diameter of the probe is in the range of about 1-5 mm or any range subsumed therein. In some embodiments, the diameter of the probe is greater than 1.5 mm or 2 mm. In some embodiments, the diameter of the probe is within a range of about +/−50% (or any range subsumed therein) of the distance between the end of the probe and the surface of the lamp body. In some embodiments, the diameter of the probe is about 2 mm and the distance between the end of the probe and the surface of the lamp body is about 2-3 mm or any range subsumed therein.

In another aspect, an end of the bulb protrudes outside of the lamp body by a distance that is greater than the thickness of at least one region of the lamp body. In some embodiments, at least one end of the bulb protrudes outside of the lamp body by at least 3-5 mm or more.

In another aspect, the shortest distance between an end of a bulb and a drive probe traverses at least one electrically conductive material in a lamp body. In some embodiments, the electrically conductive surface is spaced apart from the bulb and the drive probe. In some embodiments, the distance between an end of a bulb and a drive probe is less than 5-10 mm or any range subsumed therein. In some embodiments, this distance is less than about 8 mm. In some embodiments, this distance is greater than the distance from the end of the probe to a side of the bulb. In some embodiments, a dielectric material between the drive probe and the electrically conductive material has a higher thermal conductivity than a dielectric material between the bulb and the electrically conductive material. In some embodiments, the electrically conductive material is a metallic coating on a waveguide surface.

In another aspect, the shortest distance between an end of a bulb and a feedback probe traverses at least one electrically conductive material in a lamp body.

In some embodiments, the drive probe has a length in the lamp body that is in the range of about 10-30 mm or any range subsumed therein or more, the feedback probe has a length in the lamp body that is in the range of 0-10 mm or any range subsumed therein or less, and the bulb has a length of from about 5-15 mm or any range subsumed therein.

In some embodiments, the shortest distance between the end of a feedback probe and the closest point on the drive probe traverses one or more electrically conductive surfaces that are spaced apart from the feedback probe and drive probe. In some embodiments, the distance from the mid-point of the drive probe to the electrically conductive material is less than 1-5 mm or any range subsumed therein. In some embodiments, these surfaces are metallic surfaces of a waveguide body.

In some embodiments, the shortest distance from a midpoint on a drive probe to the central axis of a lamp body is in the range of about 1-15 mm or any range subsumed therein. In some embodiments, this distance is less than 8-10 mm. In some embodiments, this distance traverses an electrically conductive material. In some embodiments, the electrically conductive material is a metallic surface of a waveguide body.

In some embodiments, a line segment transverse to, and passing through the mid-point of, the drive probe may be defined between a point on a central axis of the lamp body and an outer surface of the lamp body. In example embodiments, the outer surface of the lamp body comprises a metallic waveguide surface. In example embodiments, the distance along this line from the central axis to the drive probe is less than the distance from the drive probe to the outer surface. In some embodiments, the distance from the central axis is 40% or less of the distance from the axis to the outer surface. In some embodiments, the distance from the drive probe to the outer surface is more than 8-15 mm or any range subsumed therein. In some embodiments, the length of the drive probe is longer than the distance between the drive probe and the outer surface. In some embodiments, the length of the drive probe is longer than the distance between the drive probe and the outer surface.

In each of the above examples, the lamp body may be configured to operate at an RF power frequency of about 1 GHz or less in some embodiments. In some embodiments, the lamp may operate at an RF power frequency of less than about 900 MHz. In some embodiments, the lamp may operate at an RF power frequency of between about 100 MHz to 1 GHz or any range subsumed therein.

In some embodiments, the relative permittivity is in the range of about 9-15 or any range subsumed therein, the frequency of the RF power is less than about 1 GHz and the volume of the lamp body is in the range of about 10 $cm^3$ to 30 $cm^3$ or any range subsumed therein. In one example, the relative permittivity is less than 10, the frequency is less than 1 GHz and the volume of the lamp body is less than 30 $cm^3$.

In some embodiments, the relative permittivity is in the range of about 9-15 or any range subsumed therein, the frequency of the RF power is less than about 2.5 GHz and the volume of the lamp body is in the range of about 4 $cm^3$ to 7 $cm^3$ or any range subsumed therein. In one example, the relative permittivity is less than 10, the frequency is less than 2.5 GHz and the volume of the lamp body is less than 7 $cm^3$.

It is understood that each of the above aspects of example embodiments may be used alone or in combination with other aspects described above or in the detailed description below. A more complete understanding of example embodiments and other aspects and advantages thereof will be gained from a consideration of the following description read in conjunction with the accompanying drawing figures provided herein. In the figures and description, numerals indicate the various features of example embodiments, like numerals referring to like features throughout both the drawings and description.

DETAILED DESCRIPTION

Figure 1A:
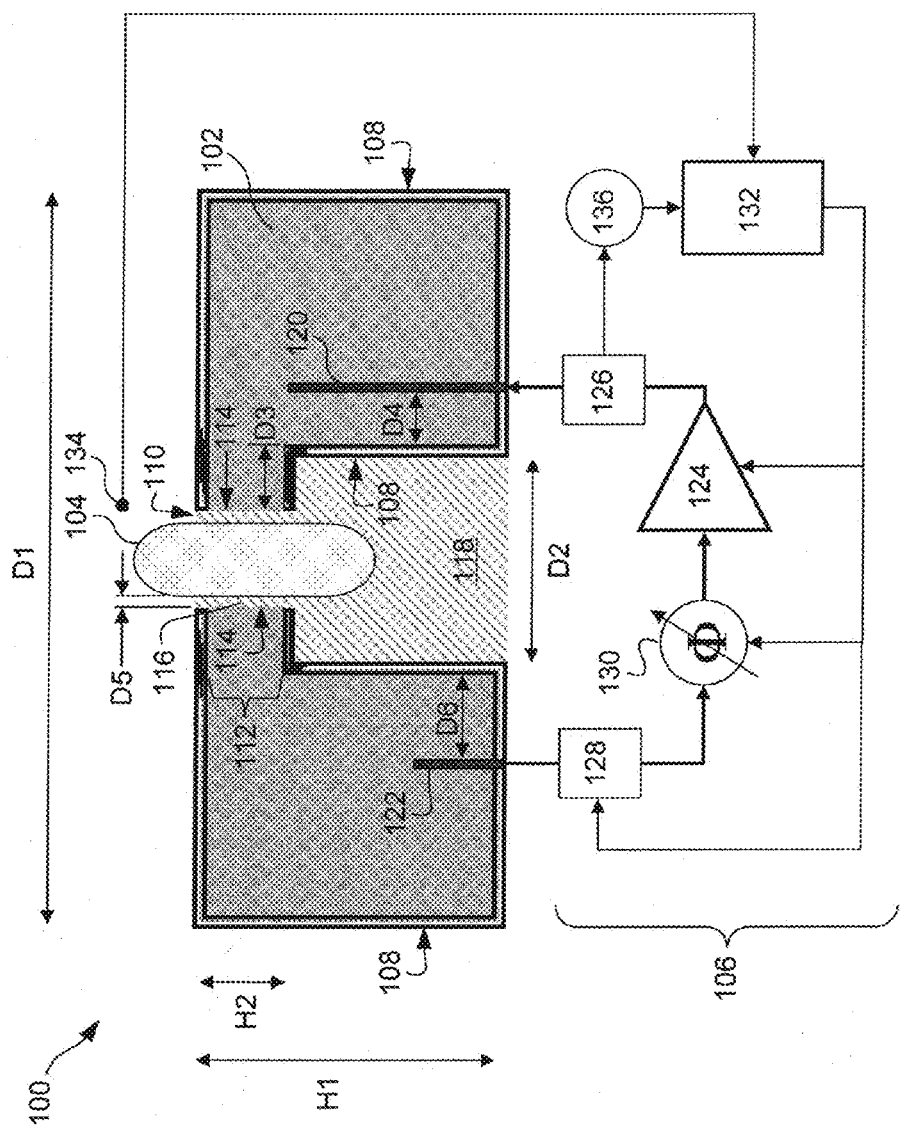
FIG. 1A is a cross-section and schematic view of a plasma lamp according to an example embodiment.

While the present invention is open to various modifications and alternative constructions, the embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

FIG. 1A is a cross-section and schematic view of a plasma lamp 100 according to an example embodiment. In example embodiments, the plasma lamp may have a lamp body 102 formed from one or more solid dielectric materials and a bulb 104 positioned adjacent to the lamp body. The bulb contains a fill that is capable of forming a light emitting plasma. A lamp drive circuit 106 couples radio frequency power into the lamp body 102 which, in turn, is coupled into the fill in the bulb 104 to form the light emitting plasma. In example embodiments, the lamp body 102 forms a waveguide that contains and guides the radio frequency power. In example embodiments, the radio frequency power may be provided at or near a frequency that resonates within the lamp body 102.

Lamp 100 has a drive probe 120 inserted into the lamp body 102 to provide radio frequency power to the lamp body 102. In the example of FIG. 1A, the lamp also has a feedback probe 122 inserted into the lamp body 102 to sample power from the lamp body 102 and provide it as feedback to the lamp drive circuit 106.

A lamp drive circuit 106 including a power supply, such as amplifier 124, may be coupled to the drive probe 120 to provide the radio frequency power. The amplifier 124 may be coupled to the drive probe 120 through a matching network 126 to provide impedance matching. In an example embodiment, the lamp drive circuit 106 is matched to the load (formed by the lamp body, bulb and plasma) for the steady state operating conditions of the lamp. The lamp drive circuit 106 is matched to the load at the drive probe 120 using the matching network 126.

In example embodiments, radio frequency power may be provided at a frequency in the range of between about 50 MHz and about 10 GHz or any range subsumed therein. The radio frequency power may be provided to drive probe 120 at or near a resonant frequency for lamp body 102. The frequency may be selected based on the dimensions, shape and relative permittivity of the lamp body 102 to provide resonance in the lamp body 102. In example embodiments, the frequency is selected for a fundamental resonant mode of the lamp body 102, although higher order modes may also be used in some embodiments. In example embodiments, the RF power may be applied at a resonant frequency or in a range of from 0% to 10% above or below the resonant frequency or any range subsumed therein. In some embodiments, RF power may be applied in a range of from 0% to 5% above or below the resonant frequency. In some embodiments, power may be provided at one or more frequencies within the range of about 0 to 50 MHz above or below the resonant frequency or any range subsumed therein. In another example, the power may be provided at one or more frequencies within the resonant bandwidth for at least one resonant mode. The resonant bandwidth is the full frequency width at half maximum of power on either side of the resonant frequency (on a plot of frequency versus power for the resonant cavity).

In example embodiments, the radio frequency power causes a light emitting plasma discharge in the bulb. In example embodiments, power is provided by RF wave coupling. In example embodiments, RF power is coupled at a frequency that forms a standing wave in the lamp body (sometimes referred to as a sustained waveform discharge or microwave discharge when using microwave frequencies). In other embodiments, a capacitively coupled or inductively coupled electrodeless plasma lamp may be used. Other high intensity discharge lamps may be used in other embodiments.

In some example embodiments, the amplifier 124 may be operated in multiple operating modes at different bias conditions to improve starting and then to improve overall amplifier efficiency during steady state operation. The bias condition of the amplifier 124 has a large impact on DC-RF efficiency. Amplifiers are classified based on their conduction angles. Class A amplifiers have a conduction angle of 360° or 2π and use 100% of the input signal. However, Class A amplifiers are not very efficient. Class A/B amplifiers have a conduction angle of 181° to 359° (π<a<2π). More than 50% but less than 100% of the input signal is used. Class B amplifiers have a conduction angle of 180° or π. 50% of the input signal is used. Class C amplifiers have a conduction angle of 0° to 179° (a<π). Less than 50% of the input signal is used. As a result, an amplifier biased to operate in Class C mode is more efficient than an amplifier biased to operate in Class B mode, which in turn is more efficient than an amplifier biased to operate in Class A/B mode. However, an amplifier biased to operate in Class A/B mode has a better dynamic range than an amplifier biased to operate in Class B mode, which in turn has better dynamic range than an amplifier biased to operate in Class C mode.

In one example, the amplifier may be biased to operate in Class A/B mode to provide better dynamic range during startup and in Class C mode during steady state operation to provide more efficiency. In another example, the amplifier may be switched back to Class A/B mode for certain modes of operation where the brightness of the lamp is modulated below a threshold level (e.g., 70%).

In other embodiments, the gate bias voltage may be adjusted during operation of the lamp to enhance efficiency even if the class of the amplifier is not changed. For example, the gate bias applied to a class D, E or F may be adjusted to enhance efficiency without changing the class of the amplifier.

The amplifier may also have a gain control that can be used to adjust the gain of the amplifier 124. Amplifier 124 may include either a plurality of gain stages or a single stage.

The feedback probe 122 is coupled to the input of the amplifier 124 through an attenuator 128 and phase shifter 130. The attenuator 128 is used to adjust the power of the feedback signal to an appropriate level for input to the phase shifter 130. In some embodiments, a second attenuator may be used between the phase shifter 130 and the amplifier 124 to adjust the power of the signal to an appropriate level for amplification by the amplifier 124. In some embodiments, the attenuator(s) may be variable attenuators controlled by the control electronics 132. In other embodiments, the attenuators may be set to a fixed value. In some embodiments, the lamp drive circuit may not include an attenuator. In an example embodiment, the phase shifter 130 may be a voltage-controlled phase shifter controlled by the control electronics 132.

The feedback loop automatically oscillates at a frequency based on the load conditions and phase of the feedback signal. This feedback loop may be used to maintain a resonant condition in the lamp body 102 even though the load conditions change as the plasma is ignited and the temperature of the lamp changes. If the phase is such that constructive interference occurs for waves of a particular frequency circulating through the loop, and if the total response of the loop (including the amplifier, lamp, and all connecting elements) at that frequency is such that the wave is amplified rather than attenuated after traversing the loop, the loop will oscillate at that frequency. Whether a particular setting of the phase-shifter induces constructive or destructive feedback depends on frequency. The phase-shifter 128 can be used to finely tune the frequency of oscillation within the range supported by the lamp's frequency response. In doing so, it also effectively tunes how well RF power is coupled into the lamp because power absorption is frequency-dependent. Thus, the phase-shifter 130 provides fast, finely-tunable control of the lamp output intensity. Both tuning and detuning are useful. For example: tuning can be used to maximize intensity as component aging changes the overall loop phase; detuning can be used to control lamp dimming. In some example embodiments, the phase selected for steady state operation may be slightly out of resonance, so maximum brightness is not achieved. This may be used to leave room for the brightness to be increased and/or decreased by control electronics 132.

In FIG. 1A, control electronics 132 is connected to attenuator 128, phase shifter 130 and amplifier 124. The control electronics 132 provide signals to adjust the level of attenuation provided by the attenuator 128, phase of phase shifter 130, the class in which the amplifier 124 operates (e.g., Class A/B, Class B or Class C mode) and/or the gain of the amplifier 124 to control the power provided to the lamp body 102. In one example, the amplifier 124 has three stages, a pre-driver stage, a driver stage and an output stage, and the control electronics 132 provides a separate signal to each stage (drain voltage for the pre-driver stage and gate bias voltage of the driver stage and the output stage). The drain voltage of the pre-driver stage can be adjusted to adjust the gain of the amplifier. The gate bias of the driver stage can be used to turn on or turn off the amplifier. The gate bias of the output stage can be used to choose the operating mode of the amplifier (e.g., Class A/B, Class B or Class C). Control electronics 132 can range from a simple analog feedback circuit to a microprocessor/microcontroller with embedded software or firmware that controls the operation of the lamp drive circuit. The control electronics 132 may include a lookup table or other memory that contains control parameters (e.g., amount of phase shift or amplifier gain) to be used when certain operating conditions are detected. In example embodiments, feedback information regarding the lamp's light output intensity is provided either directly by an optical sensor 134, e.g., a silicon photodiode sensitive in the visible wavelengths, or indirectly by an RF power sensor 136, e.g., a rectifier. The RF power sensor 136 may be used to determine forward power, reflected power or net power at the drive probe 120 to determine the operating status of the lamp. A directional coupler may be used to tap a small portion of the power and feed it to the RF power sensor 136. An RF power sensor may also be coupled to the lamp drive circuit at the feedback probe 122 to detect transmitted power for this purpose. In some embodiments, the control electronics 132 may adjust the phase shifter 130 on an ongoing basis to automatically maintain desired operating conditions.

The power to the lamp body 102 and operating class of the amplifier 124 may be controlled to provide a desired startup sequence for igniting the plasma. As the plasma ignites and heats up during the startup process, the impedance and operating conditions of the lamp change. In order to provide for efficient power coupling during steady state operation of the lamp, the lamp drive circuit 106 is impedance matched to the steady state load of the lamp body, bulb and plasma after the plasma is ignited and reaches steady state operating conditions. This allows power to be critically coupled from the drive circuit 106 to the lamp body 102 and plasma during steady state operation. However, the power from the drive circuit 106 is overcoupled to the lamp body 102 and plasma at startup.

When the power is initially turn on, the load appears as an open circuit and the power is substantially reflected. However, the gas in the bulb ignites and breaks down almost immediately. After ignition, the impedance is low and much of the power from the drive circuit 106 is reflected. For example, the amplifier 124 may provide about 170 watts of forward power, but more than half of this power may be reflected at startup. The net power to the lamp may be only between about 40-100 watts (or any range subsumed therein) after ignition and prior to substantial vaporization of the Mercury and metal halide (when the lamp transitions to high brightness), and the rest may be reflected.

Figure 2A:
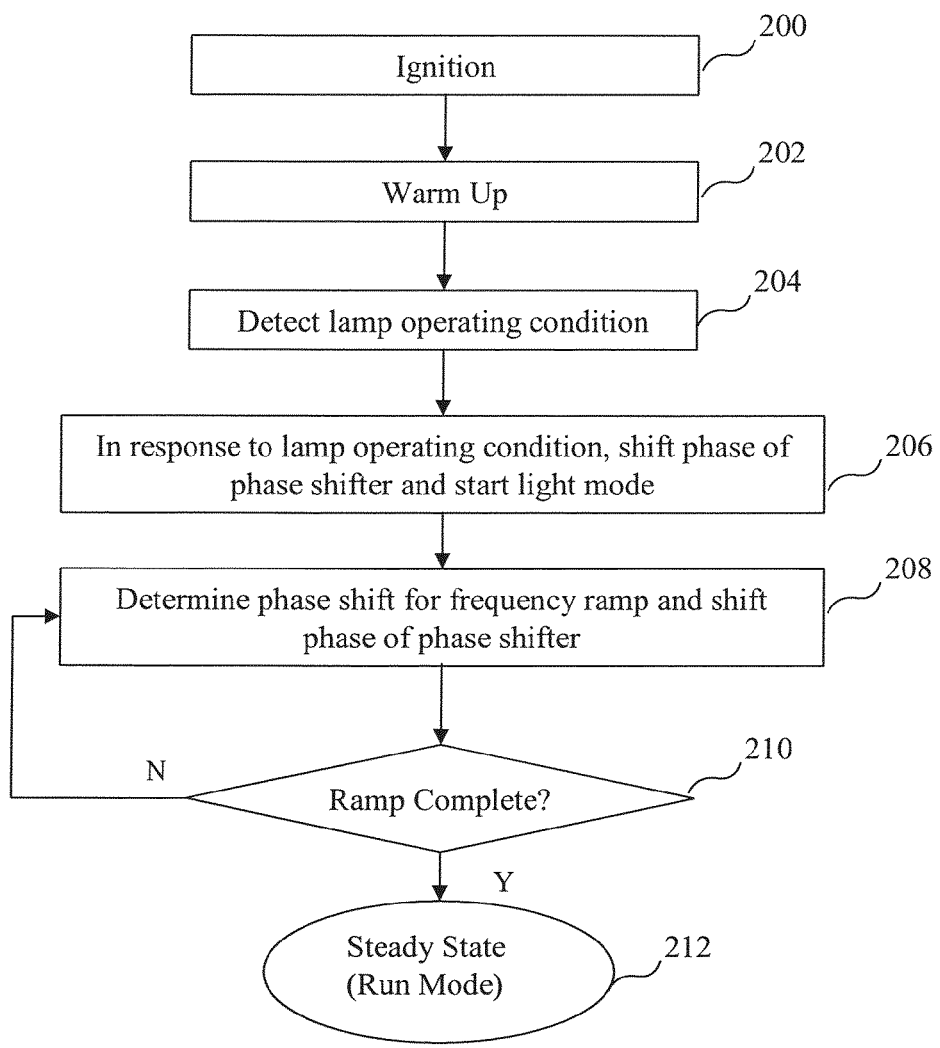
FIG. 2A is a flow chart of a method for starting an electrodeless plasma lamp according to an example embodiment.

FIG. 2 is a flow chart of an example startup procedure. In some embodiments, the amplifier is biased to operate in Class A/B mode during startup. Class A/B provides better dynamic range and more gain to allow the amplifier to ignite the plasma and to adjust to the changing load conditions during startup. Power is initially provided to the lamp body at or near a resonant frequency and the gas in the bulb 104 ignites almost immediately as indicated at 200. After ignition of the gas, the load conditions change and other fill materials in the bulb vaporize and warm up as shown at 202. Once the fill is vaporized, a bright light is emitted by the plasma. At this point, an operating condition of the lamp may be detected as indicated at 204. For example, the light from the bulb 104 may be detected by a sensor 134 and provided to the control electronics 132. Alternatively, a power sensor 136 may be used to detect the change in lamp operating conditions. When the fill is vaporized, the impedance changes and the quality factor Q of the cavity drops. When the applicable change in lamp operating conditions is detected, the phase shift of the phase shifter 130 may be automatically adjusted to accommodate for the change in frequency due to the change in the impedance of the plasma as indicated at 206. As the plasma continues to heat up, the impedance continues to change and the frequency continues to drop until the lamp reaches steady state operating conditions. As the frequency changes, the phase of the phase shifter 130 may continue to be adjusted to match the changes in frequency as indicated at 208. This ramp may take several minutes. In order to avoid a drop in brightness, the control electronics 132 adjusts the phase of the phase shifter 130 in stages to match the ramp. In an example embodiment, the control electronics 132 may change the voltage applied to the phase shifter 130 in equal increments over a set period of time for the ramp, which can be determined empirically. As shown at 210, the phase continues to be adjusted until all of the steps in the ramp are completed. While the values for the ramp may be selected based on a variety of objectives, in example embodiments the values are selected to maintain a substantially constant brightness of the lamp as the plasma heats up after high brightness is initially achieved. This allows brightness to be quickly stabilized even though the load conditions may continue to change as the plasma heats up. In other embodiments, the values may be selected to maximize power coupling or brightness, to ramp brightness in a desired way or to achieve other objectives. At the end of the ramp, the plasma has reached its full operating temperature and the lamp enters its steady state run mode as shown at 212. In some embodiments, the amplifier may be biased in Class C mode when the lamp enters its steady state run mode. This provides improved efficiency.

The changes in impedance during the startup procedure depend upon the fill in the bulb. In some example embodiments, a high pressure fill is used to increase the resistance of the gas. This can be used to decrease the overall startup time required to reach full brightness for steady state operation. In one example, a noble gas such as Neon, Argon, Krypton or Xenon is provided at high pressures between 200 Torr to 3000 Torr or any range subsumed therein. Pressures less than or equal to 760 Torr may be desired in some embodiments to facilitate filling the bulb at or below atmospheric pressure. In particular embodiments, pressures between 400 Torr and 600 Torr are used to enhance starting. Example high pressure fills may also include metal halide and Mercury which have a relatively low vapor pressure at room temperature. An ignition enhancer such as $Kr_{85}$ may also be used. In a particular example, the fill includes 1.608 mg Mercury, 0.1 mg Indium Bromide and about 10 nanoCurie of $Kr_{85}$. In this example, Argon or Krypton is provided at a pressure in the range of about 400 Torr to 700 Torr, depending upon desired startup characteristics. Initial breakdown of the noble gas is more difficult at higher pressure, but the overall warm up time required for the fill to fully vaporize and reach peak brightness is reduced. The above pressures are measured at 22° C. (room temperature). It is understood that much higher pressures are achieved at operating temperatures after the plasma is formed. For example, the lamp may provide a high intensity discharge at high pressure during operation (e.g., much greater than 2 atmospheres and 10-30 atmospheres or more in example embodiments). These pressures and fills are examples only and other pressures and fills may be used in other embodiments.

Figure 2B:
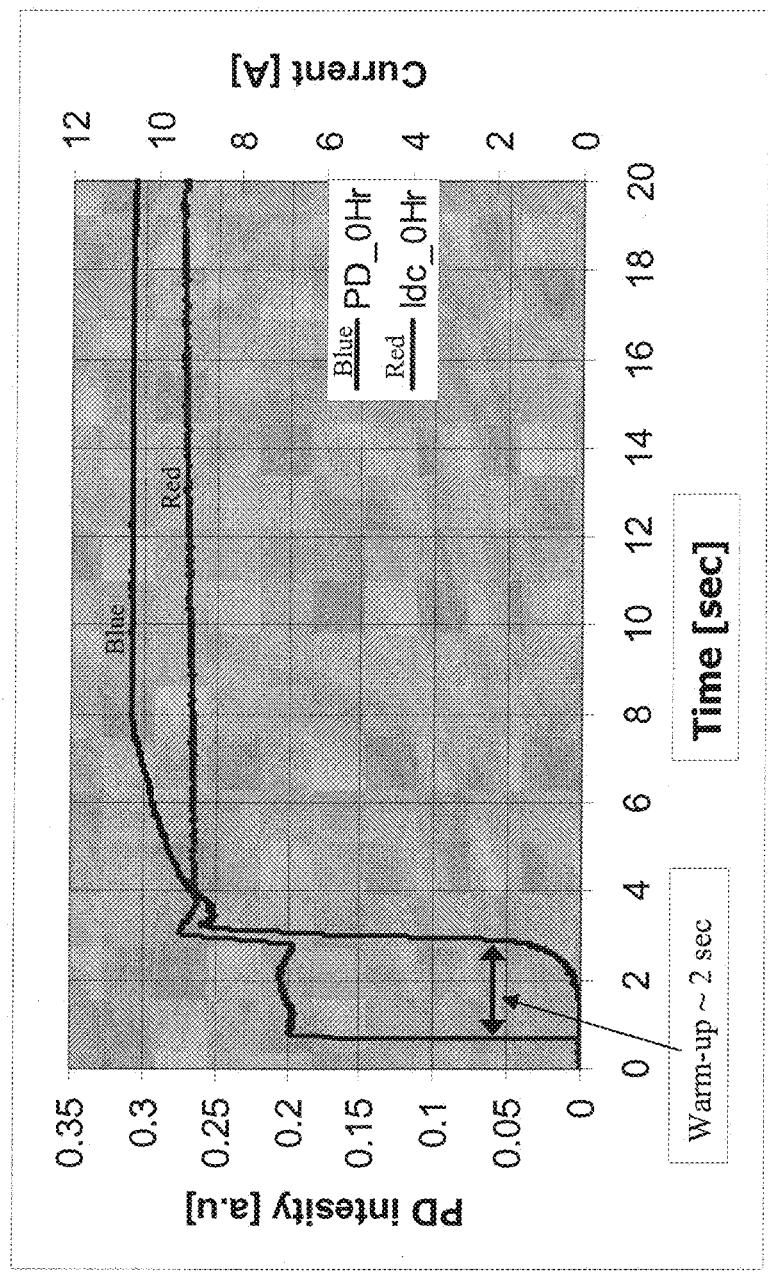
FIG. 2B illustrates the startup of a lamp using a fill according to an example embodiment.

An example startup time for a high pressure fill is illustrated in FIG. 2B. In this example, the fill includes Argon at about 400-600 Torr, Mercury and one or more metal halides such as Indium Bromide. As shown in FIG. 2B, the warm up time is short and may be less than 2 seconds in some embodiments. As shown in FIG. 2B, the warm up starts upon ignition and breakdown of the noble gas and continues until the lamp transitions to high brightness. FIG. 2B shows the intensity of light output detected by a photodiode (PD) during startup. In this example, the warm up time is indicated at a photodiode intensity of about 0.06, which is about 20% of the peak output intensity. The time from ignition to the beginning of the transition curve (e.g., around 3-5% of peak intensity) is even shorter and is slightly over a second in this example. The lamp then transitions to high brightness. The transition period from warm up to 80% peak brightness in this example is about one second. In example embodiments, it is believed that ignition time can be reduced to a fraction of a second (for example, using increased ignition enhancer) and that higher pressure noble gas can be used to further reduce warm up time (e.g., to 1-2 seconds or less). As a result, it is believed that very fast startup times of 1-3 seconds may be achieved even though the net power is limited due to the impedance mismatch during startup. FIG. 2B also shows the DC current (Idc) provided by the amplifier. As shown in FIG. 2B, the DC current may be limited during warm up. This may help reduce the potential for damage to the lamp drive circuit during periods of high reflection. After transition (e.g., 80% peak brightness) in this example, the DC current is raised to a higher level. In the example of FIG. 2E, the DC current is less than 8 Amperes during warm up and more than 8 Amperes during steady state operation, even though the impedance is substantially lower during warm up (e.g., about 10 ohms) than during steady state (e.g., about 50 ohms). In the example of FIG. 2B, once the lamp transitions to high brightness, the light output intensity of the lamp is quickly stabilized. The phase shift and resulting frequency provided by the lamp drive circuit may be adjusted to maintain a substantially constant brightness even though the load conditions continue to change as the metal halide heats up over several minutes. In one example, this is provided by adjusting phase based on predetermined parameters. In another example, the phase is automatically adjusted to maintain a constant brightness in response to a detected lamp operating condition, such as a light sensor or power sensor. In example embodiments, the brightness may be stabilized within 5-20 seconds or less, or any range subsumed therein. As shown in FIG. 2B, the brightness (as indicated by the detected photodiode intensity) is substantially constant after about 8 seconds even though the metal halide continues to heat up and load conditions continue to change. In example embodiments, the light output intensity may be maintained within +/−1% or less of a constant value during heat up of the plasma. In other embodiments, the brightness may be stabilized within a range of about 0%-3% of a constant value or any range subsumed therein. In example embodiments, the brightness during heat up may be stabilized at a brightness in the range of about 80-100% of the maximum peak brightness that can be achieved by the lamp or any range subsumed therein. In example embodiments, the steady state brightness is slightly below the maximum peak brightness to allow for brightness to be increased to compensate for aging components or other changes during the lifetime of the lamp.

Figure 3:
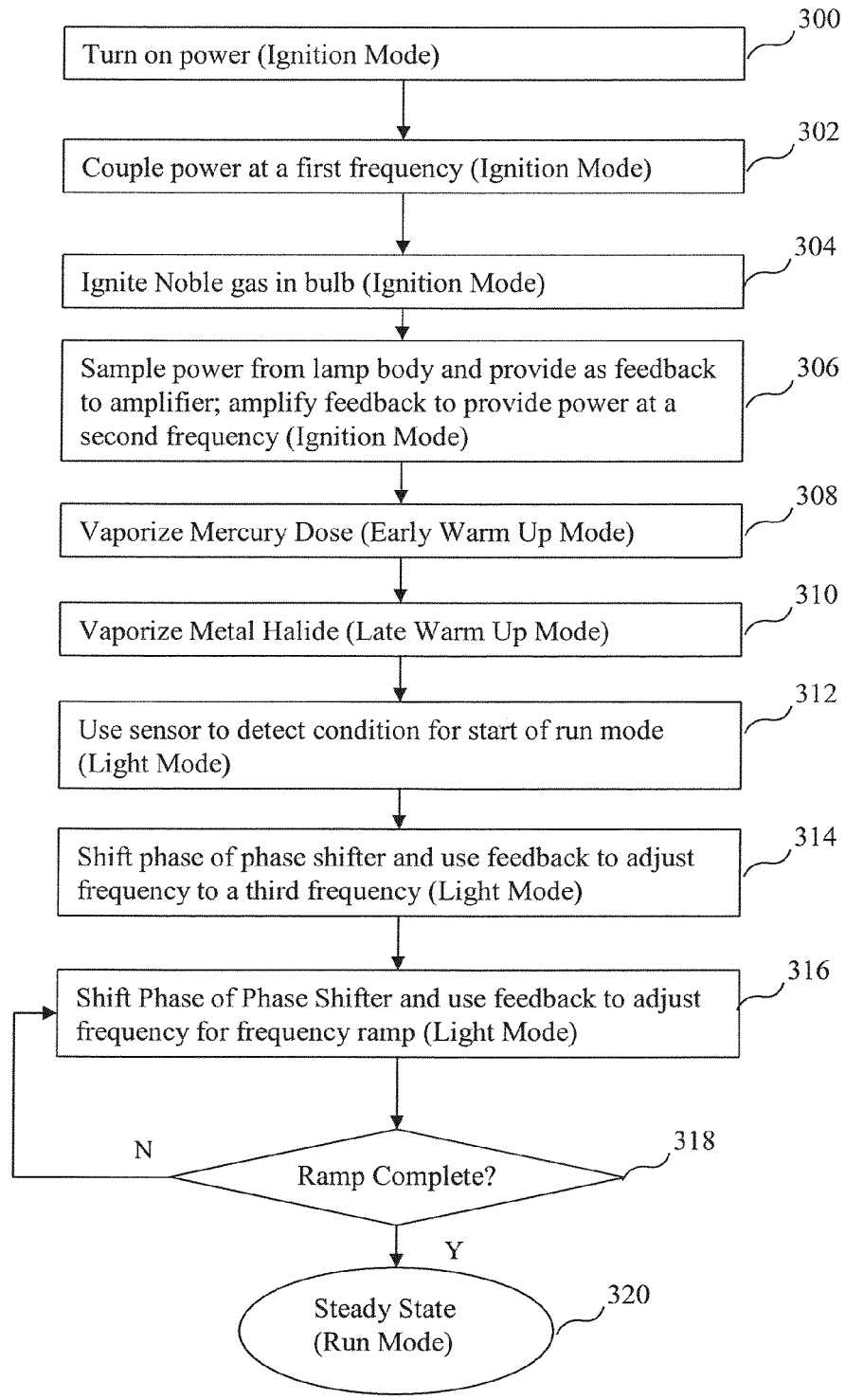
FIG. 3 is a flow chart of a method for starting an electrodeless plasma lamp with a Noble gas, Mercury and metal halide fill according to an example embodiment.

FIG. 3 is a flow chart of an example startup procedure for a fill that includes a noble gas, Mercury and metal halide. In one example, the fill includes 400-600 Torr of Argon, 1.608 mg Mercury, 0.1 mg Indium Bromide and about 10 nanoCurie of $Kr_{85}$. In this example, the lamp 100 starts at a frequency of about 895 MHz at power on (step 300 in FIG. 3) and the Argon ignites almost immediately (step 302 in FIG. 3). Upon ignition, the frequency drops to about 880 Mhz due to the change in impedance from the ignition of the Argon. The frequency is automatically adjusted by the feedback loop as indicated at 306 in FIG. 3. The Mercury then vaporizes and heats up as indicated at 308. The Indium Bromide also vaporizes and light is emitted at high brightness as indicated at 310. When this light is detected by sensor 134, the phase shifter 130 is automatically adjusted to accommodate for the change in frequency due to the change in the impedance of the plasma as indicated at 314. In one example, the threshold may be triggered by detection of visible light output intensity in the range of from about 20%-90% of peak light output intensity. In particular examples, 80% or 90% of peak output intensity is used as a threshold. In other examples, the threshold may be determined based on forward and/or reflected power detected by the lamp drive circuit. With the appropriate phase shift, the feedback loop adjusts the frequency to about 885 MHz. In an example embodiment, when this startup process is used with a high pressure fill as described above, the startup process from power on to vaporization of the fill (steps 300 to 314 in FIG. 3) may be completed in about 5-10 seconds or less. As a result, high brightness can be achieved very rapidly.

Figure 4:
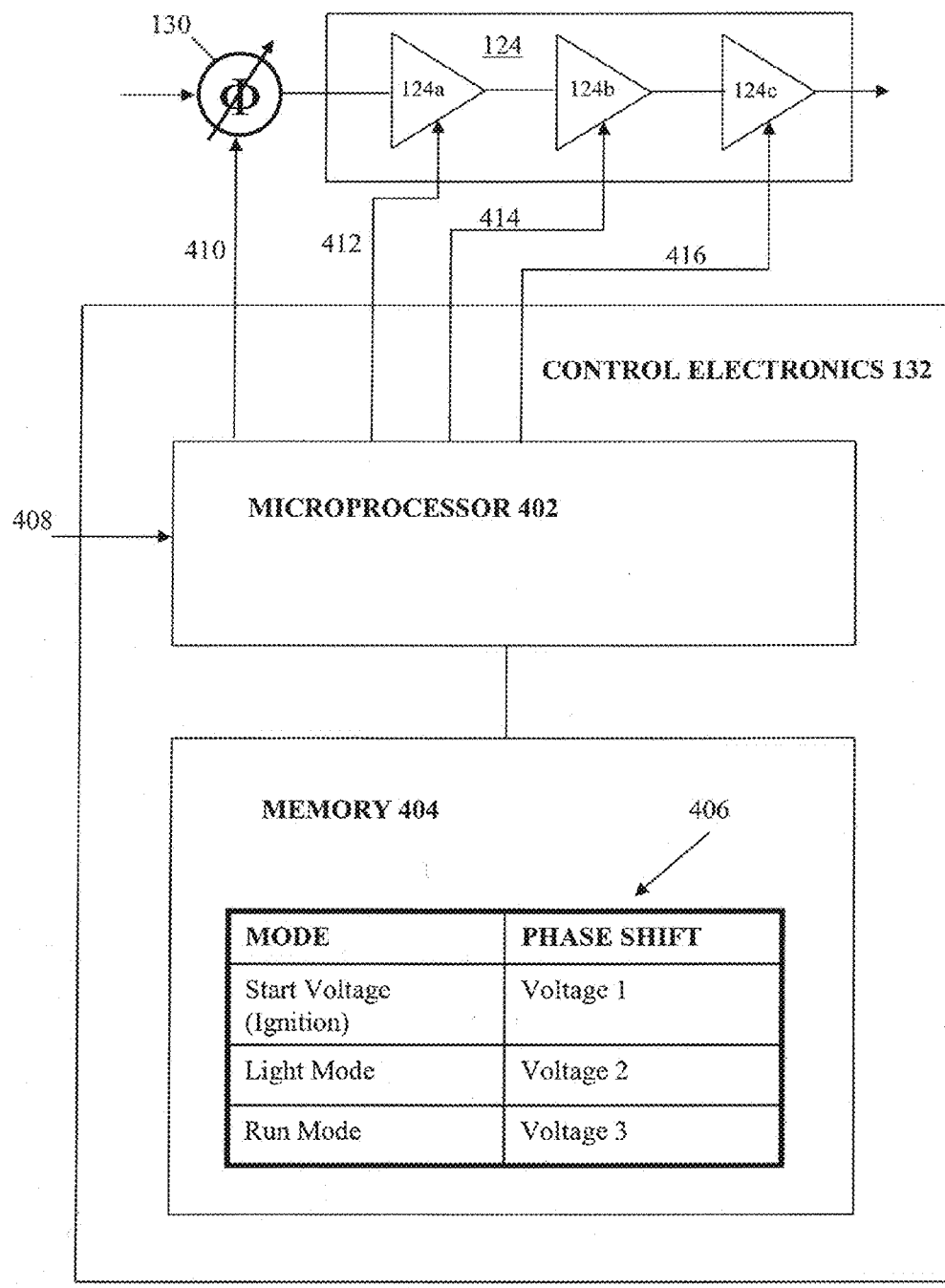
FIG. 4 is a block diagram of control electronics for an electrodeless plasma lamp according to an example embodiment.

As the plasma continues to heat up, the impedance continues to change and the frequency continues to drop until the lamp reaches steady state operating conditions. In example embodiments, the impedance after warm up is in the range of 40-60 ohms or any range subsumed therein. In a particular embodiment, the impedance is about 50 ohms during steady state operation. As the frequency changes, the phase of the phase shifter 130 may continue to be adjusted to match the changes in frequency. In an example startup procedure, the frequency ramps down to a steady state operating frequency of about 877 MHz. This ramp may take several minutes. In order to avoid a drop in brightness, the control electronics 132 adjusts the phase of the phase shifter 130 in stages to match the ramp. As shown in FIG. 4, a lookup table 406 in the control electronics 132 may be used to store a sequence of parameters indicating the amount of phase shift to be used by the control electronics 132 during the startup procedure. In one example, the voltage to be applied to the phase shifter is stored in the lookup table for startup (ignition), high (e.g., 80-90% of peak) brightness of the plasma (light mode) and steady state after the lamp is heated (run mode). A microprocessor 402 in control electronics 132 may use these parameters to shift the phase in increments between the time that transition to high brightness is detected and completion of heat up. In one example, firmware executed by the microprocessor 402 linearly interpolate between the desired phase at full vaporization (light mode) when the frequency is about 885 MHz and the desired phase at the end of heat up (run mode) when the frequency is about 877 MHz. In one example, firmware in the control electronics linearly interpolates sixteen values for the phase voltage that are applied in equal increments over a period of about 5 minutes as the lamp ramps from light mode to run mode. The phase adjustments and ramp may be determined empirically and programmed into the lookup table based on the operating conditions of the particular lamp. In order to adjust the phase, the microprocessor 402 outputs a voltage signal on a control line 410 which is connected to the phase shifter 130 (other control lines provided by the control electronics may be used to control the attenuator 128 and the amplifier 124). The phase adjustments continue in sequence until the ramp is complete as indicated at 318 in FIG. 3.

Figure 5A:
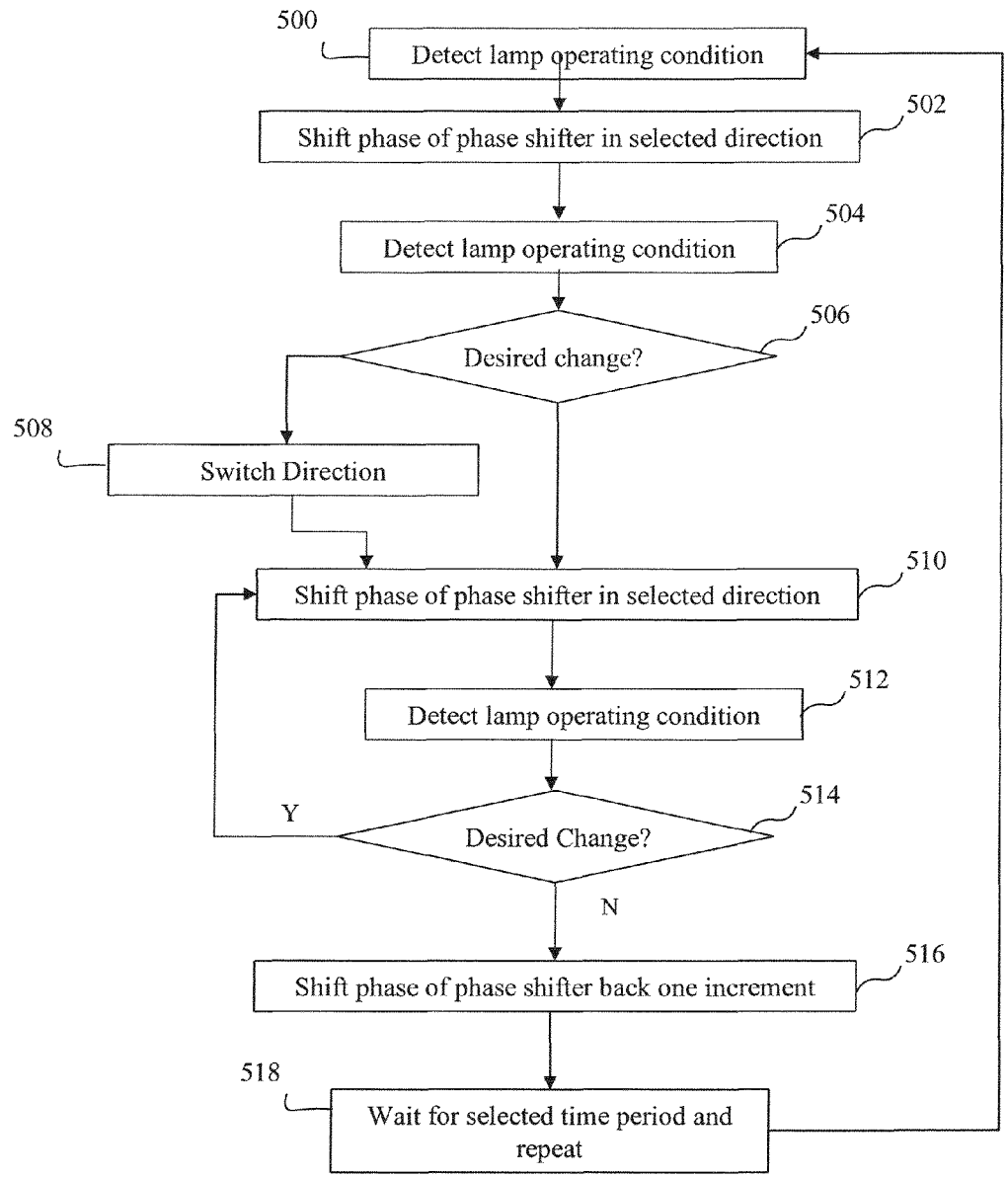
FIG. 5A is a block diagram of a method for automatically adjusting the phase of a feedback loop for an electrodeless plasma lamp according to an example embodiment.

In an alternative embodiment, the control electronics 132 may automatically shift the phase periodically to determine whether a change in one direction or another results in more efficient power coupling and/or higher brightness (based on feedback from an optical sensor or rf power sensor in the drive circuit). This periodic phase shift can be performed very rapidly, so an observer does not notice any visible change in the light output intensity. FIG. 5A is a flow chart illustrating an example method for automatically adjusting the phase. This process may be performed during startup, during ramp of the frequency or during steady state operation of the lamp as desired. As shown at 500 the control electronics detects a lamp operating condition. For example, the control electronics may receive a signal from sensor 134 indicating the intensity of the light output or a measurement from RF power detector 136. In example embodiments, the light output intensity detected by light sensor 134 may be repeatedly checked by the control electronics 132 to determine whether there has been a change in brightness. This may be checked more than once every second and in some embodiments may be checked every 300 microseconds. In some embodiments, this can be used during ramp down of frequency as the plasma heats up. In other embodiments, this can be used for brightness lock to ensure consistent brightness over the lifetime of the lamp, even if aging of components introduces changes. In some embodiments, this can also be used for brightness control. If the lamp condition is not at the desired level, the control electronics 132 then shifts the phase of the phase shifter in a small increment as indicated at 504. The direction may be determined based on the expected conditions for the particular mode of operation (e.g., based on an expectation that the frequency will ramp down during heat up of the plasma). The lamp operating condition is then measured again as indicated at 506. If the shift resulted in a desired change as indicated at step 506 (e.g., the brightness increased), then the control electronics continues to adjust the phase shift in small increments in the same direction (see step 510). If the shift did not result in a desired change (e.g., the brightness decreased), then the control electronics 132 may try shifting the phase in the opposite direction as indicated at step 518. As shown at steps 510, 512 and 514, the phase continues to be adjusted in small increments so long as the lamp operating condition continues to improve. Once the lamp operating condition is no longer improved, the phase is shifted back one increment to optimum level as indicated at step 516. In some embodiments, the control electronics 132 may then wait a set period of time before repeating the automatic phase adjustment procedure.

The phase of the phase shifter 130 and/or gain of the amplifier 124 may also be adjusted after startup to change the operating conditions of the lamp. For example, the power input to the plasma in the bulb 104 may be modulated to modulate the intensity of light emitted by the plasma. This can be used for brightness lock to maintain a constant brightness even if components age. This can also be used for brightness adjustment. If the lamp is not operating at resonance for peak brightness, the phase may be shifted to increase brightness. The phase may also be shifted to dim the lamp. In some embodiments, the lamp may be adjusted to 20% to 100% of peak brightness, or any range subsumed therein, while maintaining continuous supply of power to the lamp and without extinguishing the plasma discharge. In some embodiments, this may be accomplished by changing the phase shift without changing the voltage level that controls the gain of the amplifier. In other embodiments, the gain of the amplifier may also be adjusted. The light output intensity of the lamp may also be modulated to adjust for video effects in a projection display. For example, a projection display system may use a microdisplay that controls intensity of the projected image using pulse-width modulation (PWM). PWM achieves proportional modulation of the intensity of any particular pixel by controlling, for each displayed frame, the fraction of time spent in either the "ON" or "OFF" state. By reducing the brightness of the lamp during dark frames of video, a larger range of PWM values may be used to distinguish shades within the frame of video. This mode of operation is referred to as "Dynamic Dark". The brightness of the lamp may also be modulated during particular color segments of a color wheel for color balancing or to compensate for green snow effect in dark scenes by reducing the brightness of the lamp during the green segment of the color wheel.

In another example, the phase shifter 130 can be modulated to spread the power provided by the lamp circuit 106 over a larger bandwidth. This can reduce ElectroMagnetic Interference (EMI) at any one frequency and thereby help with compliance with FCC regulations regarding EMI. In example embodiments, the degree of spectral spreading may be from 5-30% or any range subsumed therein. In one example, the control electronics 132 may include circuitry to generate a sawtooth voltage signal and sum it with the control voltage signal to be applied to the phase shifter 130. In another example, the control electronics 132 may include a microcontroller that generates a Pulse Width Modulated (PWM) signal that is passed through an external low-pass filter to generate a modulated control voltage signal to be applied to the phase shifter 130. In example embodiments, the modulation of the phase shifter 130 can be provided at a level that is effective in reducing EMI without any significant impact on the plasma in the bulb.

Figure 5B:
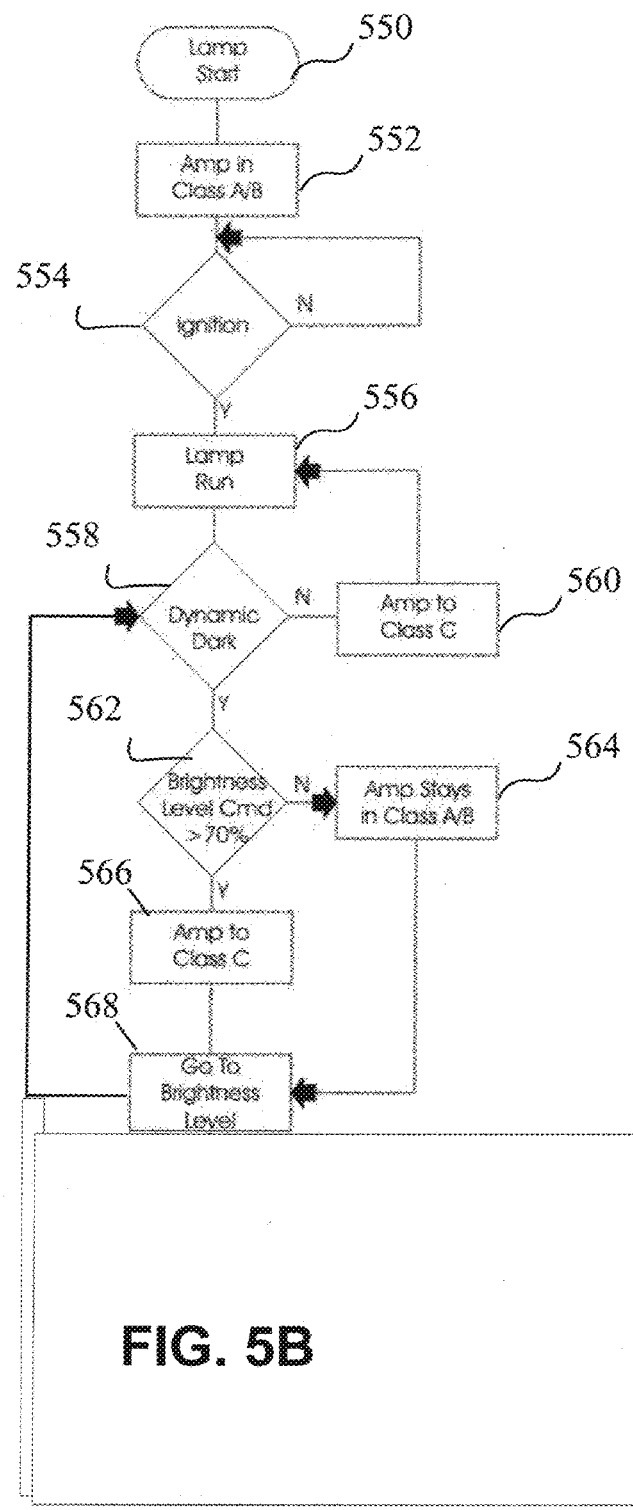
FIG. 5B is a flow chart of a method for changing the operating class of an amplifier according to an example embodiment.

In example embodiments, the amplifier 124 may be operated at different bias conditions during different modes of operation for the lamp. FIG. 5B is a flow chart showing an example method for changing the operating class of the amplifier during operation of the lamp. As shown in FIG. 5B, the lamp starts at step 550. At startup, the amplifier is in Class A/B mode as indicated at 552. At step 554, the control electronics 132 determines whether the plasma has ignited and is ready to enter run mode. The control electronics 132 may determine when the plasma achieves a threshold brightness based on inputs from optical sensor 134 or RF power sensor 136. The control electronics may be configured to wait a predetermined time after high brightness is achieved to allow for completion of heat up of the plasma before entering run mode. The lamp then enters run mode as indicated at step 556.

In this example, the control electronics is configured to switch the operating class of the amplifier 124 during Dynamic Dark mode when the brightness drops below a threshold level. As shown at step 558, the control electronics 132 checks whether the lamp is in Dynamic Dark mode. The control electronics are configured to enter Dynamic Dark mode when particular characteristics are detected in a video frame indicating that the lamp brightness can be reduced to enhance the dynamic range (e.g., based on mean brightness, maximum brightness, or other characteristics or combinations of characteristics). If the lamp is not in Dynamic Dark mode, the amplifier is changed to Class C mode as indicated at step 560 and remains in Class C mode until Dynamic Dark is detected. If the lamp is in Dynamic Dark mode, the control electronics determines whether the reduction in brightness for Dynamic Dark will cause the brightness to drop below a threshold level. In one example, the threshold is 70% of full brightness. In other examples, this threshold may range from 50-80% of full brightness or any range subsumed therein. If the brightness will drop below the threshold, the control electronics changes the bias to cause the amplifier 124 to operate in Class A/B mode as indicated at 564. This provides for greater dynamic range to accommodate the change in brightness. Otherwise the amplifier remains in Class C mode as indicated at 566, which provides better efficiency. The brightness level is then adjusted as shown at step 568. The process is then repeated as indicated at 558. This is an example only and amplifier bias may be adjusted in response to other lamp operating modes or lamp operating conditions. For example, the bias may be adjusted any time that the brightness of the lamp will drop below a threshold level (for example, a threshold in the rang of from about 20%-90% of peak brightness).

FIG. 4 is a block diagram showing example control electronics for the phase shifter 130 and amplifier 124 of lamp drive circuit 106. In the example of FIG. 4, the microprocessor 402 provides three control signals to amplifier 124. In this example, the amplifier 124 has three stages, a pre-driver stage 124a, a driver stage 124b and an output stage 124c, and the control electronics 132 provides a separate signal to each stage (drain voltage signal 412 for the pre-driver stage 124a, gate bias voltage signal 414 for the driver stage 124b and gate bias voltage signal 416 for the output stage 124c). The drain voltage of the pre-driver stage 124a can be adjusted to adjust the gain of the amplifier. The gate bias of the driver stage 124b can be used to turn on or turn off the amplifier. The gate bias of the output stage 124c can be used to choose the operating mode of the amplifier (e.g., Class A/B, Class B or Class C). In some embodiments, these signals may pass through other circuitry before being applied to the amplifier 124.

In one example, the control electronics 132 puts the amplifier 124 in Class A/B mode by applying a gate bias voltage signal 416 of about 4 volts to the output stage 124c. This turns the transistors in the output stage 124c slightly on, so they draw some current and have an conduction angle greater than 180°. The bias is removed (signal 416 is changed to 0 volts) to put the amplifier in Class C mode with a conduction angle of less than 180°. In embodiments using Class B mode, a gate bias signal 416 of about 3.4 volts is applied to the output stage 124c. This does not draw any current, but is at the borderline (with a conduction angle of about 180°). The microprocessor 402 receives one or more input signals 408 that can be used to determine lamp operating conditions and the mode of operation of the lamp. These input signals can be used by the microprocessor 402 to determine the desired operating class for the amplifier 124 and the appropriate gate bias voltage to assert on line 416. Inputs may include inputs from optical sensor 134, RF power sensor 136 or inputs from video processing circuitry or other parts of the system (e.g., to determine whether to use Dynamic Dark mode or other mode of operation).

Figure 1B:
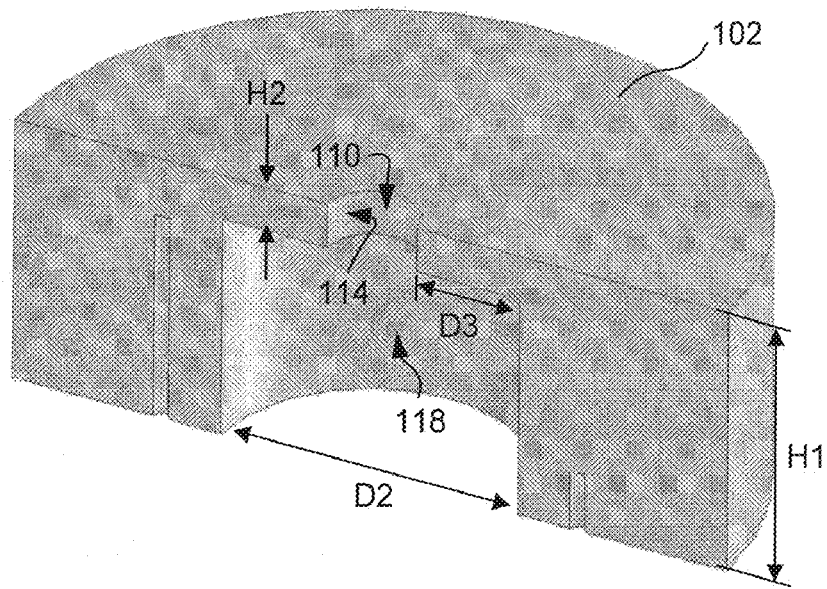
FIG. 1B is a perspective cross section view of a lamp body with a cylindrical outer surface according to an example embodiment.
Figure 1C:
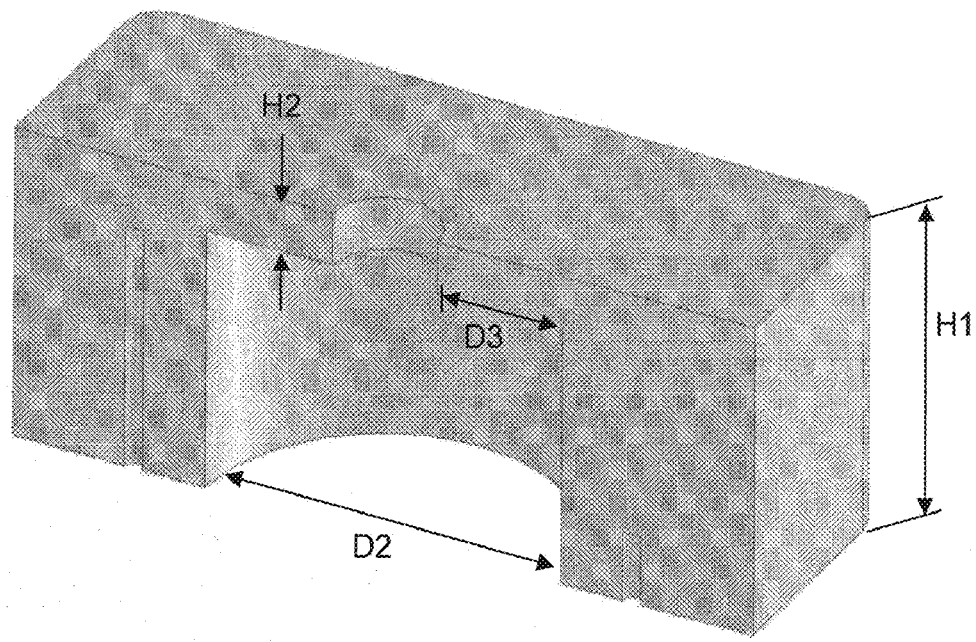
FIG. 1C is a perspective cross section view of a lamp body with a rectangular outer surface according to an alternative example embodiment.

Additional aspects of electrodeless plasma lamps according to example embodiments will now be described with reference to FIGS. 1A, 1B and 1C. In example embodiments, the lamp body 102 has a relative permittivity greater than air. The frequency required to excite a particular resonant mode in the lamp body 102 generally scales inversely to the square root of the relative permittivity (also referred to as the dielectric constant) of the lamp body. As a result, a higher relative permittivity results in a smaller lamp body required for a particular resonant mode at a given frequency of power. The shape and dimensions of the lamp body 102 also affect the resonant frequency as described further below. In an example embodiment, the lamp body 102 is formed from solid alumina having a relative permittivity of about 9.2. In some embodiments, the dielectric material may have a relative permittivity in the range of from 2 to 100 or any range subsumed therein, or an even higher relative permittivity. In some embodiments, the body may include more than one such dielectric material resulting in an effective relative permittivity for the body within any of the ranges described above. The body may be rectangular, cylindrical or other shape as described further below.

In example embodiments, the outer surfaces of the lamp body 102 may be coated with an electrically conductive coating 108, such as electroplating or a silver paint or other metallic paint which may be fired onto the outer surface of the lamp body. The electrically conductive material 108 may be grounded to form a boundary condition for the radio frequency power applied to the lamp body 102. The electrically conductive coating helps contain the radio frequency power in the lamp body. Regions of the lamp body may remain uncoated to allow power to be transferred to or from the lamp body. For example, the bulb 104 may be positioned adjacent to an uncoated portion of the lamp body to receive radio frequency power from the lamp body.

In the example embodiment of FIG. 1A, an opening 110 extends through a thin region 112 of the lamp body 102. The surfaces 114 of the lamp body 102 in the opening 110 are uncoated and at least a portion of the bulb 104 may be positioned in the opening 110 to receive power from the lamp body 102. In example embodiments, the thickness H2 of the thin region 112 may range from 1 mm to 10 mm or any range subsumed therein and may be less than the outside length and/or interior length of the bulb. One or both ends of the bulb 104 may protrude from the opening 110 and extend beyond the electrically conductive coating 108 on the outer surface of the lamp body. This helps avoid damage to the ends of the bulbs from the high intensity plasma formed adjacent to the region where power is coupled from the lamp body. In other embodiments, all or a portion of the bulb may be positioned in a cavity extending from an opening on the outer surface of the lamp body and terminating in the lamp body. In other embodiments, the bulb may be positioned adjacent to an uncoated outer surface of the lamp body or in a shallow recess formed on the outer surface of the waveguide body. In some example embodiments, the bulb may be positioned at or near an electric field maxima for the resonant mode excited in the lamp body.

The bulb 104 may be quartz, sapphire, ceramic or other desired bulb material and may be cylindrical, pill shaped, spherical or other desired shape. In one example embodiment, the bulb is cylindrical in the center and forms a hemisphere at each end. In one example, the outer length (from tip to tip) is about 15 mm and the outer diameter (at the center) is about 5 mm. In this example, the interior of the bulb (which contains the fill) has an interior length of about 9 mm and an interior diameter (at the center) of about 2.2 mm. The wall thickness is about 1.4 mm along the sides of the cylindrical portion and about 2.25 mm at the front end and about 3.75 mm on the other end. In this example, the interior bulb volume is about 31.42 mm$^3$. In other example embodiments, the bulb may have an interior width or diameter in a range between about 2 and 30 mm or any range subsumed therein, a wall thickness in a range between about 0.5 and 4 mm or any range subsumed therein, and an interior length between about 2 and 30 mm or any range subsumed therein. In example embodiments, the interior bulb volume may range from 10 mm$^3$ and 750 mm$^3$ or any range subsumed therein. These dimensions are examples only and other embodiments may use bulbs having different dimensions.

In example embodiments, the bulb 104 contains a fill that forms a light emitting plasma when radio frequency power is received from the lamp body 102. The fill may include a noble gas and a metal halide. Additives such as Mercury may also be used. An ignition enhancer may also be used. A small amount of an inert radioactive emitter such as $Kr_{85}$ may be used for this purpose. In other embodiments, different fills such as Sulfur, Selenium or Tellurium may also be used. In some examples, a metal halide such as Cesium Bromide may be added to stabilize a discharge of Sulfur, Selenium or Tellurium. As described above, some embodiments may use a high pressure fill to enhance starting.

A layer of material 116 may be placed between the bulb 104 and the dielectric material of lamp body 102. In example embodiments, the layer of material 116 may have a lower thermal conductivity than the lamp body 102 and may be used to optimize thermal conductivity between the bulb 104 and the lamp body 102. In an example embodiment, the layer 116 may have a thermal conductivity in the range of about 0.5 to 10 watts/meter-Kelvin (W/mK) or any range subsumed therein. For example, alumina powder with 55% packing density (45% fractional porosity) and thermal conductivity in a range of about 1 to 2 watts/meter-Kelvin (W/mK) may be used. In some embodiments, a centrifuge may be used to pack the alumina powder with high density. In an example embodiment, a layer of alumina powder is used with a thickness D5 within the range of about ⅛ mm to 1 mm or any range subsumed therein. Alternatively, a thin layer of a ceramic-based adhesive or an admixture of such adhesives may be used. Depending on the formulation, a wide range of thermal conductivities is available. In practice, once a layer composition is selected having a thermal conductivity close to the desired value, fine-tuning may be accomplished by altering the layer thickness. Some example embodiments may not include a separate layer of material around the bulb and may provide a direct conductive path to the lamp body. Alternatively, the bulb may be separated from the lamp body by an air-gap (or other gas filled gap) or vacuum gap.

In some example embodiments, alumina powder or other material may also be packed into a recess 118 formed below the bulb 104. In the example shown in FIG. 1A, the alumina powder in the recess 118 is outside the boundaries of the waveguide formed by the electrically conductive material 108 on the surfaces of the lamp body 102. The material in the recess 118 provides structural support, reflects light from the bulb and provides thermal conduction. One or more heat sinks may also be used around the sides and/or along the bottom surface of the lamp body to manage temperature. Thermal modeling may be used to help select a lamp configuration providing a high peak plasma temperature resulting in high brightness, while remaining below the working temperature of the bulb material. Example thermal modeling software includes the TAS software package available commercially from Harvard Thermal, Inc. of Harvard, Mass.

In an example embodiment, the probes 120 and 122 may be brass rods glued into the lamp body using silver paint. In other embodiments, a sheath or jacket of ceramic or other material may be used around the bulbs, which may change the coupling to the lamp body. In an example embodiment, a printed circuit board (pcb) may be positioned transverse to the lamp body for the drive electronics. The probes 120 and 122 may be soldered to the pcb and extend off the edge of the pcb into the lamp body (parallel to the pcb and orthogonal to the lamp body). In other embodiments, the probes may be orthogonal to the pcb or may be connected to the lamp drive circuit through SMA connectors or other connectors. In an alternative embodiment, the probes may be provided by a pcb trace and portions of the pcb board containing the trace may extend into the lamp body. Other radio frequency feeds may be used in other embodiments, such as microstrip lines or fin line antennas.

In an example embodiment, the drive probe 120 is positioned closer to the bulb in the center of the lamp body than the electrically conductive material 108 around the outer circumference of the lamp body 102. This positioning of the drive prove 120 can be used to improve coupling of power to the plasma in the bulb 104.

An amplifier 124 is used to provide radio frequency power to the drive probe 120. A high efficiency amplifier may have some unstable regions of operation. The amplifier 124 and phase shift imposed by the feedback loop of the lamp circuit 106 should be configured so that the amplifier operates in stable regions even as the load condition of the lamp changes. The phase shift imposed by the feedback loop is determined by the length of the loop (including matching network 126) and any phase shift imposed by circuit elements such as a phase shifter 130. At initial startup before the noble gas in the bulb is ignited, the load appears to the amplifier as an open circuit. The load characteristics change as the noble gas ignites, the fill vaporizes and the plasma heats up to steady state operating conditions. The amplifier and feedback loop are designed so the amplifier will operate within stable regions across the load conditions that may be presented by the lamp body, bulb and plasma. The amplifier 124 may include impedance matching elements such as resistive, capacitive and inductive circuit elements in series and/or in parallel. Similar elements may be used in the matching network. In one example embodiment, the matching network is formed from a selected length of pcb trace that is included in the lamp drive circuit between the amplifier 124 and the drive probe 120. These elements are selected both for impedance matching and to provide a phase shift in the feedback loop that keeps the amplifier within stable regions of its operation. A phase shifter 130 may be used to provide additional phase shifting as needed to keep the amplifier in stable regions.

The amplifier 124 and phase shift in the feedback loop may be designed by looking at the reflection coefficient Γ, which is a measure of the changing load condition over the various phases of lamp operation, particularly the transition from cold gas at start-up to hot plasma at steady state. Γ, defined with respect to a reference plane at the amplifier output, is the ratio of the "reflected" electric field $E_{in}$ heading into the amplifier, to the "outgoing" electric field $E_{out}$ traveling out. Being a ratio of fields, Γ is a complex number with a magnitude and phase. A useful way to depict changing conditions in a system is to use a "polar-chart" plot of Γ's behavior (termed a "load trajectory") on the complex plane. Certain regions of the polar chart may represent unstable regions of operation for the amplifier 124. The amplifier 124 and phase shift in the feedback loop should be designed so the load trajectory does not cross an unstable region. The load trajectory can be rotated on the polar chart by changing the phase shift of the feedback loop (by using the phase shifter 130 and/or adjusting the length of the circuit loop formed by the lamp drive circuit to the extent permitted while maintaining the desired impedance matching. The load trajectory can be shifted radially by changing the magnitude (e.g., by using an attenuator).

High frequency simulation software may be used to help select the materials and shape of the lamp body and electrically conductive coating to achieve desired resonant frequencies and field intensity distribution in the lamp body. Simulations may be performed using software tools such as HFSS, available from Ansoft, Inc. of Pittsburgh, Pa., and FEMLAB, available from COMSOL, Inc. of Burlington, Mass. to determine the desired shape of the lamp body, resonant frequencies and field intensity distribution. The desired properties may then be fine-tuned empirically.

While a variety of materials, shapes and frequencies may be used, one example embodiment has a lamp body 102 designed to operate in a fundamental TM resonant mode at a frequency of about 880 MHz (although the resonant frequency changes as lamp operating conditions change as described further below). In this example, the lamp has an alumina lamp body 102 with a relative permittivity of 9.2. The lamp body 102 has a cylindrical outer surface as shown in FIG. 1B with a recess 118 formed in the bottom surface. In an alternative embodiment shown in FIG. 1C, the lamp body 102 may have a rectangular outer surface. The outer diameter D1 of the lamp body 102 in FIG. 1B is about 40.75 mm and the diameter D2 of the recess 118 is about 8 mm. In other examples, the diameter D2 may range from about 4 mm to 10 mm or any range subsumed therein. The lamp body has a height H1 of about 17 mm. In other examples, the height H1 may range from about 10 mm to 30 mm or any range subsumed therein. A narrow region 112 forms a shelf over the recess 118. The thickness H2 of the narrow region 112 is about 2 mm and may range from about 1-8 mm in other embodiments or any range subsumed therein. As shown in FIG. 1A, in this region of the lamp body 102 the electrically conductive surfaces on the lamp body are only separated by the thin region 112 of the shelf. This results in higher capacitance in this region of the lamp body and higher electric field intensities. This shape has been found to support a lower resonant frequency than a solid cylindrical body having the same overall diameter D1 and height H1 or a solid rectangular body having the same overall width and height.

In some embodiments, the relative permittivity of the dielectric lamp body is in the range of about 9-15 or any range subsumed therein, the frequency of the RF power is less than about 1 GHz and the volume of the lamp body is in the range of about 10 cm$^3$ to 30 cm$^3$ or any range subsumed therein. In one example, the relative permittivity is less than 10, the frequency is less than 1 GHz and the volume of the lamp body is less than 30 cm$^3$.

In some embodiments, the relative permittivity of the dielectric lamp body is in the range of about 9-15 or any range subsumed therein, the frequency of the RF power is less than about 2.5 GHz and the volume of the lamp body is in the range of about 4 cm$^3$ to 7 cm$^3$ or any range subsumed therein. In one example, the relative permittivity is less than 10, the frequency is less than 2.5 GHz and the volume of the lamp body is less than 7 cm$^3$.

In this example, a hole 110 is formed in the thin region 112. The hole has a diameter of about 5.5 mm and the bulb has an outer diameter of about 5 mm. The shelf formed by the thin region 112 extends radially from the edge of the hole 110 by a distance D3 of about 1.25 mm. D3 may range from 0.5 to 5 mm or any range subsumed therein. Alumina powder is packed between the bulb and the lamp body and forms a layer having a thickness D5 of about ¼ mm. The alumina powder has a lower thermal conductivity than the lamp body and avoids cold spots on the bulb. However, the short gap distance provides a higher capacitance between the top and bottom metallic surfaces of the shelf and the impedance of the plasma in the bulb. In example embodiments, the gap is as thin as possible while maintaining desired thermal properties.

In this example, the bulb 104 has an outer length of about 15 mm and an interior length of about 9 mm. The interior diameter at the center is about 2.2 mm and the side walls have a thickness of about 1.4 mm. The bulb protrudes from the front surface of the lamp body by about 4.7 mm. In this example, the bulb has a high pressure fill of Argon at a pressure in the range of about 400-750 Torr, Kr$_{85}$, Mercury and Indium Bromide. At pressures above 400 Torr, a sparker or other ignition aid may be used for initial ignition. Aging of the bulb may facilitate fill breakdown, and the fill may ignite without a separate ignition aid after burn-in of about 72 hours.

In this example, the drive probe 120 is about 15 mm long with a diameter of about 2 mm. The drive probe 120 is about 7 mm from the central axis of the lamp body and a distance D4 of about 3 mm from the electrically conductive material 108 on the inside surface of recess 118. The relatively short distance from the drive probe 120 to the bulb 104 enhances coupling of power. In example embodiments, the feedback probe is further from the inside surface of the recess. In an example embodiment, the distance D6 is about 11 mm. In other examples, D6 may range from about 4 mm to 20 mm or any range subsumed therein. In some examples, the feedback probe may be closer to the outer metal surface of the lamp body than the central axis. In some examples, the feedback probe may be closer to the outer metal surface of the lamp body than the inner surface of the recess. In one example, a 15 mm hole is drilled for the feedback probe 122 to allow the length and coupling to be adjusted. The unused portion of the hole may be filled with PTFE (Teflon) or another material. In this example, the feedback probe 122 has a length of about 3 mm and a diameter of about 2 mm. In another embodiment where the length of the hole matches the length of the feedback probe 122, the length of the feedback probe 122 is about 1.5 mm.

In this example, the bulb is positioned adjacent to narrow region 112 where the electric field of the radio frequency power in the lamp body is at a maximum. In this example, the drive probe 120 and feedback probe 122 are not positioned at a maxima or minima of the electric field of the radio frequency power in the lamp body. In example embodiments, the position of the probes may be selected for desired power coupling and impedance matching.

In this example, the lamp drive circuit 106 includes an attenuator 128, phase shifter 130, amplifier 124, matching network 126 and control electronics 132 such as a microprocessor or microcontroller that controls the drive circuit. A sensor 134 detects the intensity of light emitted by the bulb 104 and provides this information to the control electronics 132 to control the drive circuit 132. In an alternative embodiment, an RF power sensor 136 may be used to detect forward, reflected or net power to be used by the control electronics to control the drive circuit.

Figure 6B:
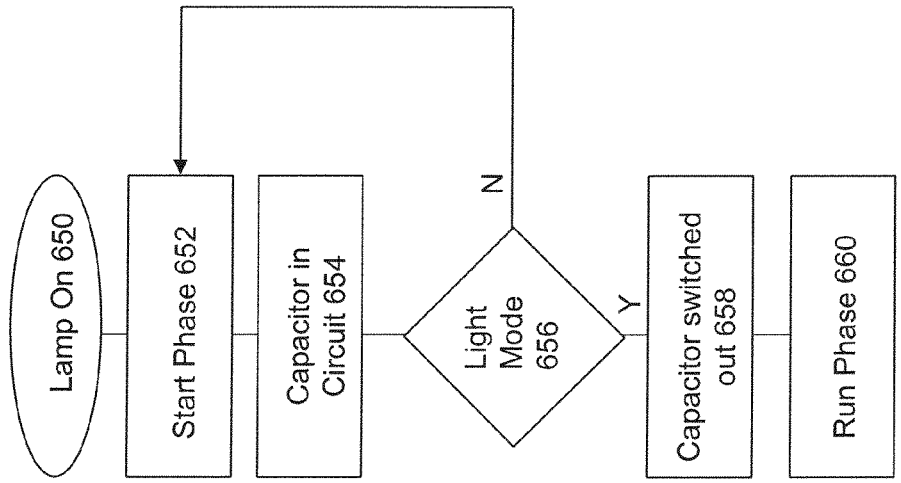
FIG. 6B is a flow chart of a method for starting a lamp using a switched capacitor.
Figure 6A:
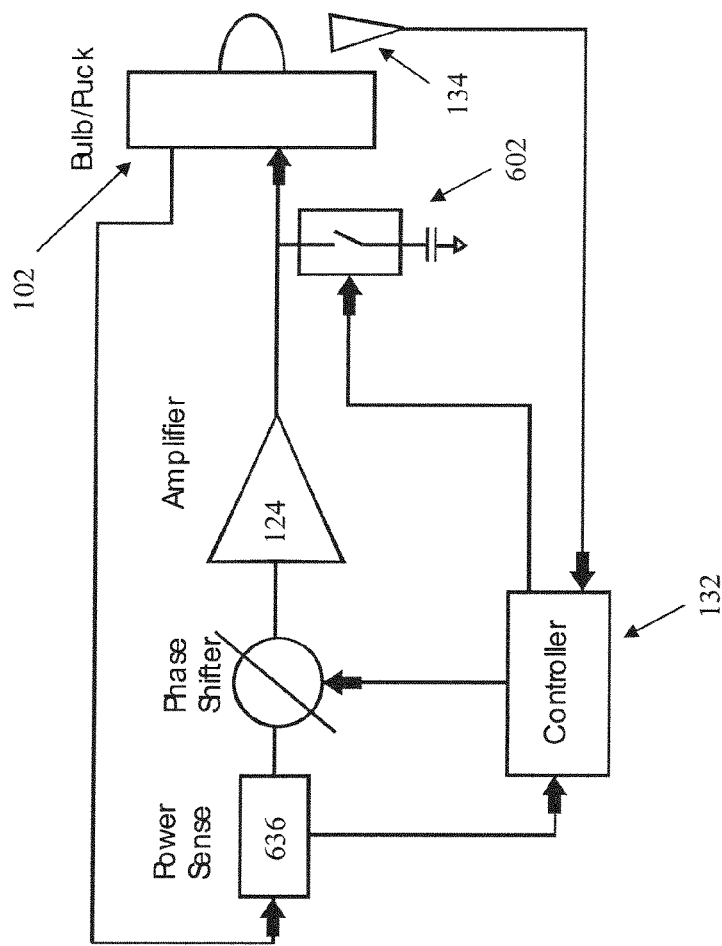
FIG. 6A is a block diagram of a lamp and drive circuit with a switched capacitor.

FIG. 6A is a block diagram of a lamp and drive circuit according to an alternate embodiment that uses a switched capacitor to better match the load during startup. FIG. 6B is a flow chart of a method for starting a lamp using a switched capacitor. As shown in FIG. 6A, the lamp drive circuit includes a switched capacitor circuit 602 in parallel between the amplifier 124 and lamp body 102. The controller 132 provides a signal to the switched capacitor circuit 602 that either includes the capacitance in the impedance matching network between the amplifier 124 and the lamp body 102 or remove the capacitance. The controller receives inputs from a power sensor 636 and/or light sensor 134 to determine when to switch the capacitance. In other embodiments, this may also be determined by a timer circuit or other method. Other embodiments may also switch other impedance matching circuit elements in and out of the circuit as the load conditions change. As shown in FIG. 6B the lamp is turned on at 650. The noble gas then ignites and the lamp start phase begins as indicated at 652. In this example, the capacitance from the capacitor circuit 602 is included in the circuit as indicated at 654. The capacitance is selected to provide a better impedance match to the load during startup when the resistance in the fill is lower. This improves the power coupling to the plasma during startup and can be used to decrease startup time. Once the Mercury and metal halide in the fill vaporizes, the load conditions change and the lamp transitions to high brightness. This transition can be detected based on power from power sensor 636 or light output intensity from photodiode 134 (e.g., 20%-90% of peak intensity or any range subsumed therein). Once the particular lamp operating condition is detected, the capacitor is switched out of the circuit as indicated at 658. This provides for better impedance matching and improved power coupling during run mode.

Figure 7B:
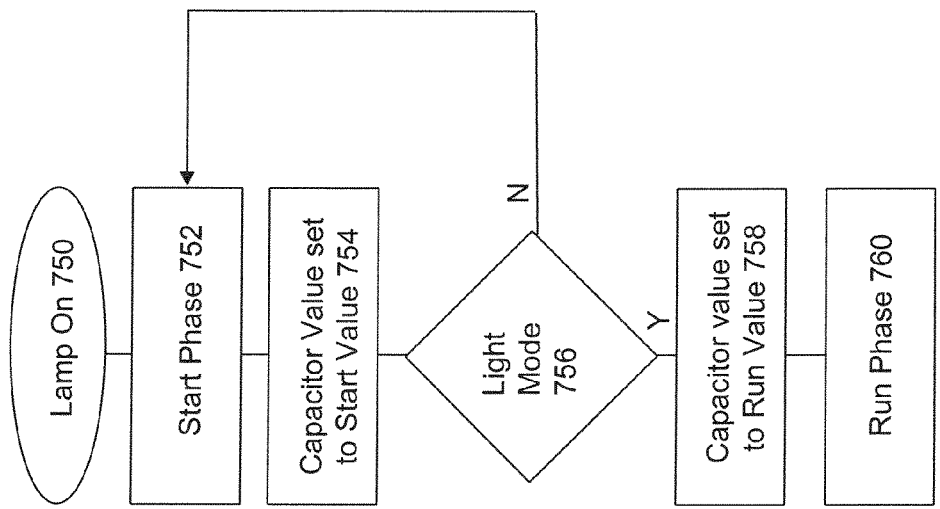
FIG. 7B is a flow chart of a method for starting a lamp using a variable capacitor.
Figure 7A:
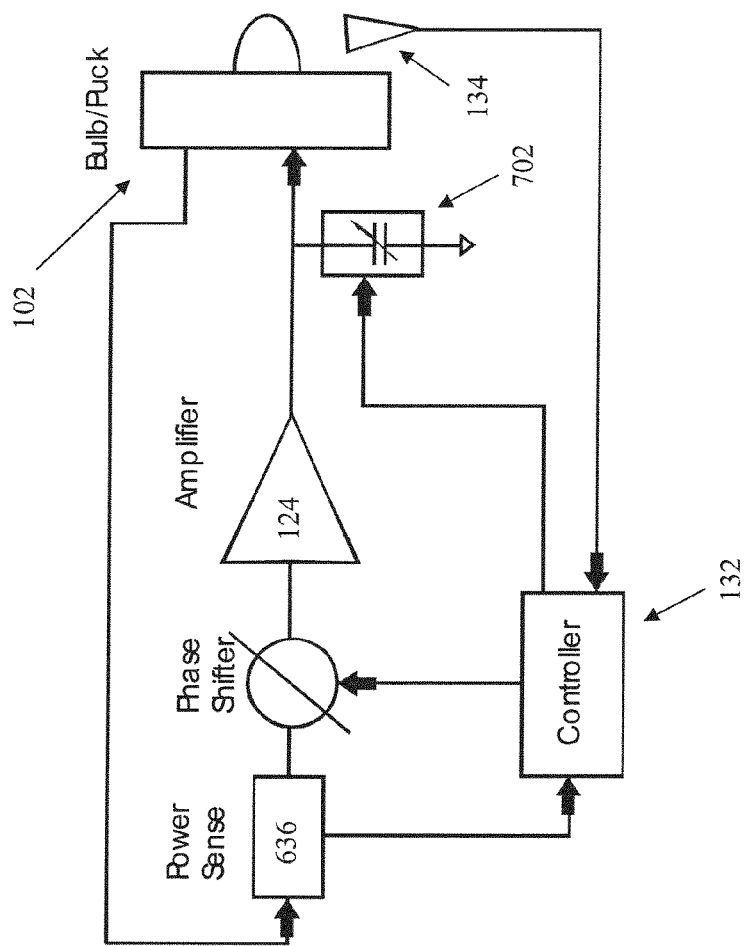
FIG. 7A is a block diagram of a lamp and drive circuit with a variable capacitor.

FIG. 7A is a block diagram of a lamp and drive circuit according to an alternate embodiment that uses a variable capacitor to better match the load during startup. FIG. 7B is a flow chart of a method for starting a lamp using a variable capacitor. As shown in FIG. 7A, the lamp drive circuit includes a variable capacitor 702 in parallel between the amplifier 124 and lamp body 102. The controller 132 provides a signal to the variable capacitor circuit 602 to set the level of capacitance that is included in the impedance matching network between the amplifier 124 and the lamp body 102. The controller receives inputs from a power sensor 636 and/or light sensor 134 to determine when to adjust the capacitance. In other embodiments, this may also be determined by a timer circuit or other method. Other embodiments may also adjust or switch other impedance matching circuit elements (which may be in parallel or in series). As shown in FIG. 7B the lamp is turned on at 750. The noble gas then ignites and the lamp start phase begins as indicated at 752. In this example, the capacitance from the capacitor circuit 602 is set to a first value during startup as indicated at 754. The capacitance is selected to provide a better impedance match to the load during startup when the resistance in the fill is lower. This improves the power coupling to the plasma during startup and can be used to decrease startup time. Once the Mercury and metal halide in the fill vaporizes, the load conditions change and the lamp transitions to high brightness. This transition can be detected based on power from power sensor 636 or light output intensity from photodiode 134 (e.g., about 20%-90% of peak intensity or any range subsumed therein). Once the particular lamp operating condition is detected, the capacitor is adjusted to a different value for run mode as indicated at 758. This provides for better impedance matching and improved power coupling during run mode.

The above circuits, dimensions, shape, materials and operating parameters are examples only and other embodiments may use different circuits, dimensions, shape, materials and operating parameters.

What is claimed is:

1. An electrodeless plasma lamp comprising:
   a bulb containing a fill that forms a light-emitting plasma;
   a power amplifier to provide radio frequency power to the fill at a frequency in the range of about 50 MHz to 10 GHz, the power amplifier configured to operate in at least two classes of operation; and
   control electronics configured to change the class of operation of the power amplifier during operation of the plasma lamp.

2. The electrodeless plasma lamp of claim 1, wherein the power amplifier is configured to operate as a class A/B amplifier during at least a first mode of operation and a class C amplifier during at least a second mode of operation.

3. The electrodeless plasma lamp of claim 2, wherein the first mode of operation is a startup mode during which the plasma warms up.

4. The electrodeless plasma lamp of claim 2, wherein the second mode of operation is steady state mode operation during which the plasma lamp operates above a threshold level of brightness.

5. The electrodeless plasma lamp of claim 2, wherein the first mode of operation is a mode during which the plasma lamp operates below a threshold level of brightness.

6. The electrodeless plasma lamp of claim 5, wherein the threshold level is in the range of about 50% to 80% of peak brightness of the plasma lamp.

7. The electrodeless plasma lamp of claim 1, wherein the power amplifier operates in a first mode of operation during startup and a second mode of operation during steady state operation of the lamp, and wherein during the first mode of operation the power amplifier is configured to operate with a greater dynamic range than in the second mode of operation.

8. The electrodeless plasma lamp of claim 1, wherein the power amplifier operates in a first mode of operation during startup and a second mode of operation during steady state operation of the lamp, and wherein during the second mode of operation the amplifier is configured to operate more efficiently than in the first mode of operation.

9. The electrodeless plasma lamp of claim 1, wherein the control electronics is configured to change the class of operation of the amplifier based on an operating condition of the plasma.

10. The electrodeless plasma lamp of claim 1, further comprising a light sensor for detecting light output intensity from the bulb, wherein the control electronics is configured to change the class of operation of the power amplifier in response to a signal from the light sensor.

11. The electrodeless plasma lamp of claim 1, further comprising a power sensor for detecting power provided by the power amplifier, wherein the control electronics is configured to change the class of operation of the power amplifier in response to a signal from the power sensor.

12. The electrodeless plasma lamp of claim 1, wherein the control electronics is configured to change the class of operation of the power amplifier by changing a gate bias of the power amplifier.

13. The electrodeless plasma lamp of claim 1, further comprising a lamp body and a radio frequency (RF) feed coupled to the power amplifier to provide RF power to the lamp body, wherein the bulb is adjacent to the lamp body and the fill receives the RF power from the lamp body.

14. The electrodeless plasma lamp of claim 13, wherein the power amplifier is configured to provide RF power at a frequency that forms a standing wave within the lamp body.

15. The electrodeless plasma lamp of claim 13 wherein:
   the lamp body comprises a dielectric material having a relative permittivity greater than 2; and
   the power amplifier is configured to provide RF power at a frequency that is within the resonant bandwidth of a resonant mode for the lamp body.

16. The electrodeless plasma lamp of claim 1, wherein the fill includes a metal halide and the power amplifier provides a net radio frequency (RF) power of at least 100 watts after the vaporization of the metal halide.

17. The electrodeless plasma lamp of claim 1, further comprising a resonant structure comprising a dielectric material and an electrically conductive material, the resonant structure proximate the bulb, wherein the power amplifier provides radio frequency (RF) power to the resonant structure at a frequency within a resonant bandwidth for the resonant structure.

18. The electrodeless plasma lamp of claim 17, wherein the dielectric material is a solid dielectric material having a volume in the range of about 4 $cm^3$ to 30 $cm^3$.

19. A method for controlling operation of a plasma lamp, the method comprising:
   providing a bulb containing a fill that forms a light-emitting plasma;
   coupling power from a power amplifier to the fill at a frequency in the range of about 50 MHz to 10 GHz; and
   changing the class of operation of the power amplifier during operation of the plasma lamp.

20. An electrodeless plasma lamp comprising:
   a bulb containing a fill that forms a light-emitting plasma;
   a power amplifier configured to provide radio frequency power to the fill at a frequency in the range of about 50 MHz to 10 GHz, the power amplifier configured to operate in at least two classes of operation; and
   means for changing the class of operation of the power amplifier during operation of the plasma lamp.

* * * * *